(12) United States Patent
Huang et al.

(10) Patent No.: US 11,704,468 B2
(45) Date of Patent: Jul. 18, 2023

(54) PUZZLE-BASED PATTERN ANALYSIS AND CLASSIFICATION

(71) Applicant: Siemens Industry Software Inc., Plano, TX (US)

(72) Inventors: Jia-Tze Huang, Beaverton, OR (US); Jonathan James Muirhead, Portland, OR (US)

(73) Assignee: Siemens Industry Software Inc., Plano, TX (US)

( * ) Notice: Subject to any disclaimer, the term of this patent is extended or adjusted under 35 U.S.C. 154(b) by 139 days.

(21) Appl. No.: 17/245,834

(22) Filed: Apr. 30, 2021

(65) Prior Publication Data

US 2021/0248301 A1 Aug. 12, 2021

Related U.S. Application Data

(62) Division of application No. 16/216,127, filed on Dec. 11, 2018, now Pat. No. 11,023,648.

(60) Provisional application No. 62/597,848, filed on Dec. 12, 2017.

(51) Int. Cl.
*G06F 30/398* (2020.01)
*G03F 1/36* (2012.01)
*H01L 21/027* (2006.01)
*G06F 30/20* (2020.01)
*G06F 119/18* (2020.01)

(52) U.S. Cl.
CPC .............. *G06F 30/398* (2020.01); *G03F 1/36* (2013.01); *H01L 21/027* (2013.01); *G06F 30/20* (2020.01); *G06F 2119/18* (2020.01)

(58) Field of Classification Search
CPC .... G06F 16/24578; G06F 1/36; G06F 16/219; G06F 30/20; G06F 30/398; G06F 16/00; G06F 16/2228; G06F 2119/18; H01L 21/027; Y02P 90/02
See application file for complete search history.

(56) References Cited

U.S. PATENT DOCUMENTS

| | | | | |
|---|---|---|---|---|
| 7,418,693 B1* | 8/2008 | Gennari | .................. | G06F 30/39 716/55 |
| 7,584,450 B2* | 9/2009 | Tang | .......................... | G03F 1/36 716/112 |
| 7,735,053 B2* | 6/2010 | Harazaki | .................... | G03F 1/36 716/53 |
| 8,151,219 B2* | 4/2012 | Huckabay | ............... | G06F 30/39 716/50 |

(Continued)

*Primary Examiner* — Eric D Lee

(57) ABSTRACT

Methods and apparatus for pattern matching and classification are disclosed. In one example of the disclosed technology, a method of performing pattern matching according to a puzzle-matching the methodology includes analyzing an original source layout pattern and determining a signature for the original source layout pattern. A target layout is scanned to search for one or more portions of the target layout that have a signature that matches or is similar to the signature of the original source pattern. Similar patterns are searched based on a signature comparison of the source pattern and the target layout. In some examples of the disclosed technology, it is possible to match partial context to the original source pattern. In some examples, matches can be made in the target layout for different orientations of layout.

8 Claims, 17 Drawing Sheets

(56) References Cited

U.S. PATENT DOCUMENTS

| | | | | |
|---|---|---|---|---|
| 8,341,571 B1* | 12/2012 | Lei | ............ | G06F 30/39 |
| | | | | 716/112 |
| 8,832,621 B1* | 9/2014 | Gennari | ............ | G06F 30/398 |
| | | | | 716/112 |
| 9,053,259 B1* | 6/2015 | Gennari | ............ | G06F 30/398 |
| 9,251,299 B1* | 2/2016 | Sal | ............ | G06F 30/00 |
| 9,378,327 B2* | 6/2016 | Cheng | ............ | G06F 30/398 |
| 9,401,014 B2* | 7/2016 | Zafar | ............ | G06F 30/398 |
| 9,519,732 B1* | 12/2016 | Gennari | ............ | G06F 30/00 |
| 10,310,372 B1* | 6/2019 | Yenikaya | ............ | G03F 1/36 |
| 10,382,417 B2* | 8/2019 | Chen | ............ | G01R 31/2851 |
| 10,596,219 B2* | 3/2020 | Srinivasan | ............ | A61K 38/00 |
| 10,796,070 B2* | 10/2020 | Srivastava | ............ | G03F 1/36 |
| 10,895,864 B2* | 1/2021 | Pikus | ............ | G03F 7/70466 |
| 10,922,468 B1* | 2/2021 | Sabry | ............ | G06F 30/39 |
| 11,003,828 B1* | 5/2021 | Mousa | ............ | G06F 30/392 |
| 11,010,528 B2* | 5/2021 | Chen | ............ | G06F 30/36 |
| 11,017,147 B2* | 5/2021 | Hegazy | ............ | G03F 7/70433 |
| 11,360,382 B2* | 6/2022 | Cecil | ............ | G06F 30/39 |
| 2004/0063000 A1* | 4/2004 | Maurer | ............ | G06F 30/39 |
| | | | | 430/311 |
| 2004/0230936 A1* | 11/2004 | Cobb | ............ | G03F 1/36 |
| | | | | 716/53 |
| 2016/0300338 A1* | 10/2016 | Zafar | ............ | G06T 7/001 |
| 2017/0032075 A1* | 2/2017 | Juang | ............ | G06F 30/398 |
| 2018/0068047 A1* | 3/2018 | van Kervinck | ............ | H01L 21/027 |
| 2018/0120704 A1* | 5/2018 | van Kervinck | ............ | H01L 21/768 |
| 2018/0164792 A1* | 6/2018 | Lin | ............ | G05B 19/41875 |
| 2018/0293334 A1* | 10/2018 | Leu | ............ | G06F 30/13 |
| 2019/0205773 A1* | 7/2019 | Ackerman | ............ | G06N 5/027 |
| 2019/0294753 A1* | 9/2019 | Pandey | ............ | G06F 30/398 |
| 2022/0309222 A1* | 9/2022 | Abercrombie | ............ | G06F 30/398 |

* cited by examiner

FIG. 7

710 — Fixed Center, general tolerance = 90%

|   | 3 | 6 | 9 |
|---|---|---|---|
|   | 2 | 5 | 8 |
|   | 1 | 4 | 7 |

740

| 3 100% | 6 100% | 9 100% |
|---|---|---|
| 2 90% | 5 60% | 8 100% |
| 1 100% | 4 100% | 7 100% |

730 — partial match →

| 3 100% | 6 100% | 9 100% |
|---|---|---|
| 2 90% | 5 100% | 8 100% |
| 1 100% | 4 90% | 7 100% |

720

| 3 100% | 6 100% | 9 90% |
|---|---|---|
| 2 90% | 5 100% | 8 100% |
| 1 100% | 4 60% | 7 80% |

700

FIG. 9
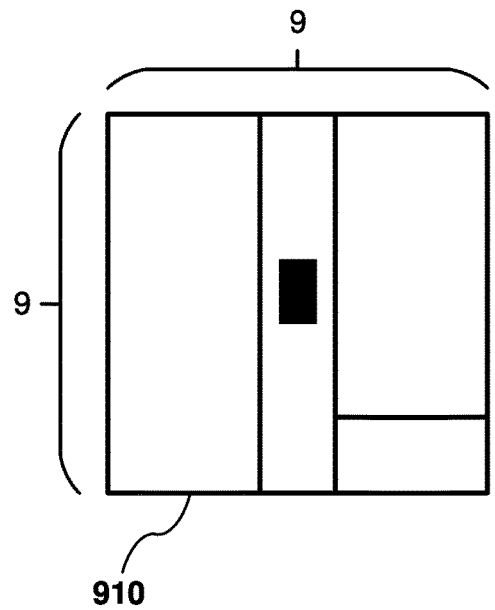
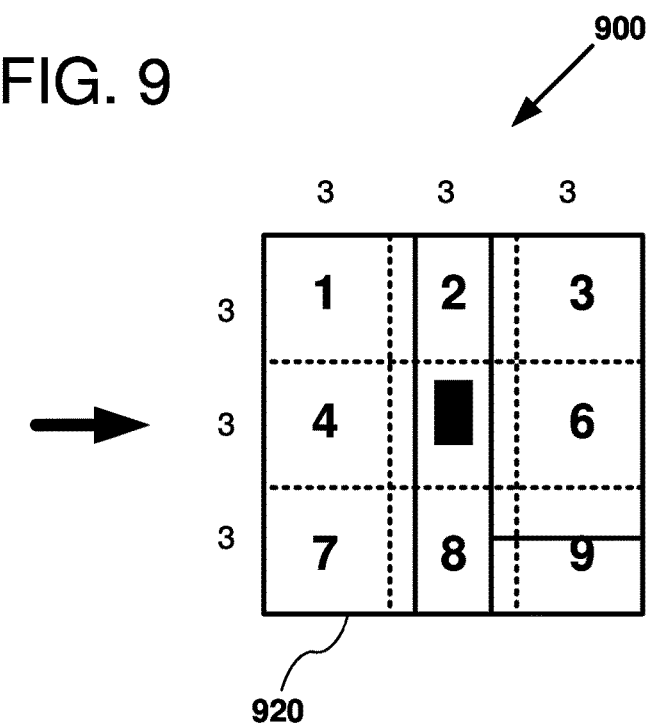
FIG. 10
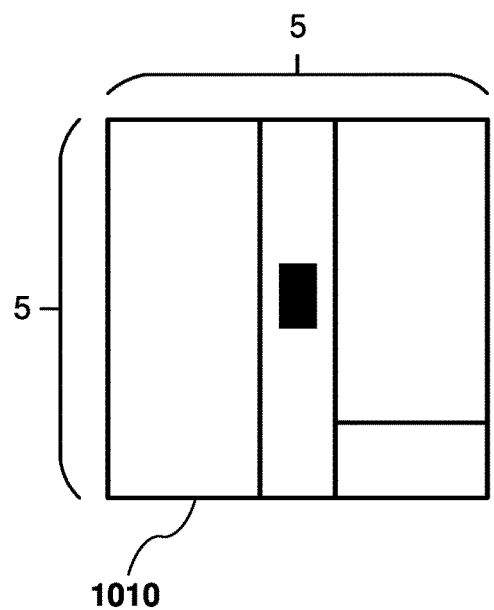
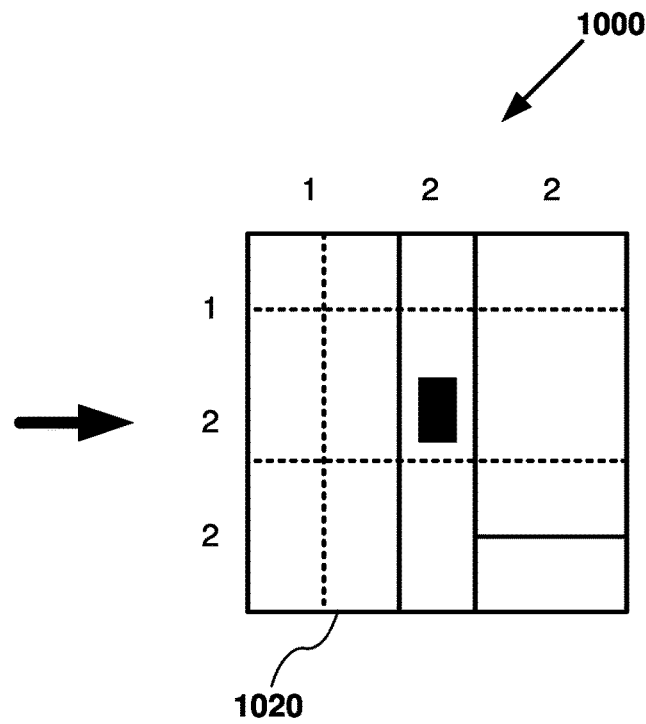

PUZZLE-BASED PATTERN ANALYSIS AND CLASSIFICATION

CROSS-REFERENCE TO RELATED APPLICATIONS

This application claims the benefit of and priority to U.S. Provisional Application No. 62/597,848, filed Dec. 12, 2017, which application is incorporated herein by reference in its entirety. This application is a divisional, and claims the benefit, of U.S. patent application Ser. No. 16/216,127, filed Dec. 11, 2018, which are hereby incorporated by reference to the extent permitted by law.

BACKGROUND

Design patterns have a wide variety of applications in the design, verification, and test flows of integrated circuits (ICs). A design pattern comprises one or more polygons confined within a fixed 2-D space on one or more layers of a layout design; a polygon is formed by a set of edges; and an edge has two vertexes. Design patterns can be defined based on size and/or location specifications of these layout elements.

Design patterns can be used to capture complex geometric relationships, which enables advanced physical verification and design methodology checks. These checks in turn enable manufacture of photolithographic masks, reticles, which are used to manufacture integrated circuits. Design patterns may be used for visual identification of problematic topological configurations during manufacturing process simulations, failure analysis, and other verification/validation techniques. Simulations and layout analysis techniques can detect design features or configurations that will likely fail or negatively impact yield during manufacturing due to a variety of defects. Failure analysis can use post-manufacture silicon testing and yield analysis techniques to identify and isolate systematic defects that appear repetitively across dies and designs. These problematic configurations can be used to identify and isolate specific geometric configurations (patterns) directly from a layout design through pattern matching.

A conventional reference pattern capture process often involved visual inspection and measurement by a designer familiar with the common failure mechanisms. The complexities of today's integrated circuits have made this task sufficiently complex that it can no-longer be reliably or confidently done by hand. Therefore, there is ample room for improvement in the development of new pattern matching techniques that can identify electrically sensitive circuit elements in layout designs with minimum human effort and can process these identified elements to achieve the desired electrical characteristics.

SUMMARY

Apparatus and methods are disclosed herein for performing pattern matching on layout patterns and pattern classification with sub-patterns. In some examples of the disclosed technology, an input pattern of layout features includes two-dimensional shapes assigned to one or more layers. Each of the layers represents data that can be used in the manufacture of a photolithographic mask or reticle. For example, a first two-dimensional layer can represent Metal1, a second layer can represent Vial, third layer can represent Metal2, a fourth layer can represent a diffusion layer, a fifth layer can represent polysilicon, and so forth.

In some examples of the disclosed technology, patterns in a set of layout features are determined by finding windows within the set of layout features. For example, the window can be a square or rectangle of a predetermined height and width. Within the window, the pattern can be divided into a number of sub-patterns. For example, the window can be divided into a 3×3 set of nine sub-patterns. Each of the sub-windows is assigned a metric based on the amount of a layout feature that appears within that portion of the sub-window. In some examples, an anchor layer or an anchor pattern is first determined using the window.

In some examples of the disclosed technology, a method of performing pattern matching according to a puzzle-matching the methodology includes analyzing an original source layout pattern and determining a signature for the original source layout pattern. A target layout is scanned to search for one or more portions of the target layout that have a signature that matches or is similar to the signature of the original source pattern. Similar patterns are searched based on a signature comparison of the source pattern and the target layout. In some examples of the disclosed technology, it is possible to match partial context to the original source pattern. In some examples, matches can be made in the target layout for different orientations of layout.

In some examples of the disclosed technology, a method of puzzle-based pattern matching includes decomposing and original pattern into nine sub-patterns. In some examples, a library is built including a number of patterns, each of the patterns having nine sub-patterns. The puzzle-based pattern matching continues by performing signature generation for the library of patterns. Using the signatures in the pattern library, those patterns can be searched for in a target layout pattern. A number of windows are determined in the target layout representing where a complete or partial match for a sub-pattern was determined. For example, an intermediate layout file in GDSII or OASIS format can be output with marker layers indicating the locations of sub-patterns. The puzzle-based pattern matching continues by identifying surrounding sub-pattern layers based on the marker layers. As will be readily understood to one of ordinary skill in the relevant art, the number of sub-patterns that a pattern is decomposed into may vary. For example, a pattern may be decomposed into 2, 4, 6, 9, 12, 16, 25, or other number of sub-patterns. In some examples, the number of sub-patterns is fixed for a particular pattern library. In other examples, number of sub-patterns may vary, for example based on the layers used for a particular pattern, a region of layout being analyzed, or based on other parameters.

The puzzle-based pattern matching continues by searching for similar patterns in the layout. For example, a sub-pattern that exactly matches one or more of the patterns in the input pattern library can be selected as an anchor. Sub-windows around the anchor sub-pattern can then be compared to the reference pattern in the library. The matches in the reference library need not be exact matches. For example, the sub-window may match based on a certain percentage of overlap. For example, a sub-window may have a 100%, a 90%, a 60%, a 15%, a 0%, or other percentage of matching. Next, metrics for nine sub-windows for the pattern being considered can be calculated. Then, the matches can be selected and sorted based on similarity between the matched pattern and the pattern in the library. For example, a pattern having a higher percentage of matching across nine sub-windows can be scored higher than another pattern for the same region that has a lower percentage of matching.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, any trademarks used herein remain the property of their respective owners. The foregoing and other objects, features, and advantages of the disclosed embodiments will become more apparent from the following detailed description, which proceeds with reference to the accompanying figures.

BRIEF DESCRIPTION OF THE DRAWINGS

FIG. 7 is a diagram illustrating an example method of performing partial pattern matching, as can be performed in certain examples of the disclosed technology.

FIG. 9 is a diagram illustrating an example method of uniform pattern generation, as can be performed in certain examples of the disclosed technology.

FIG. 10 is a diagram illustrating an example of nonuniform pattern generation, as can be performed in certain examples of the disclosed technology.

DETAILED DESCRIPTION

General Considerations

Figure 1:
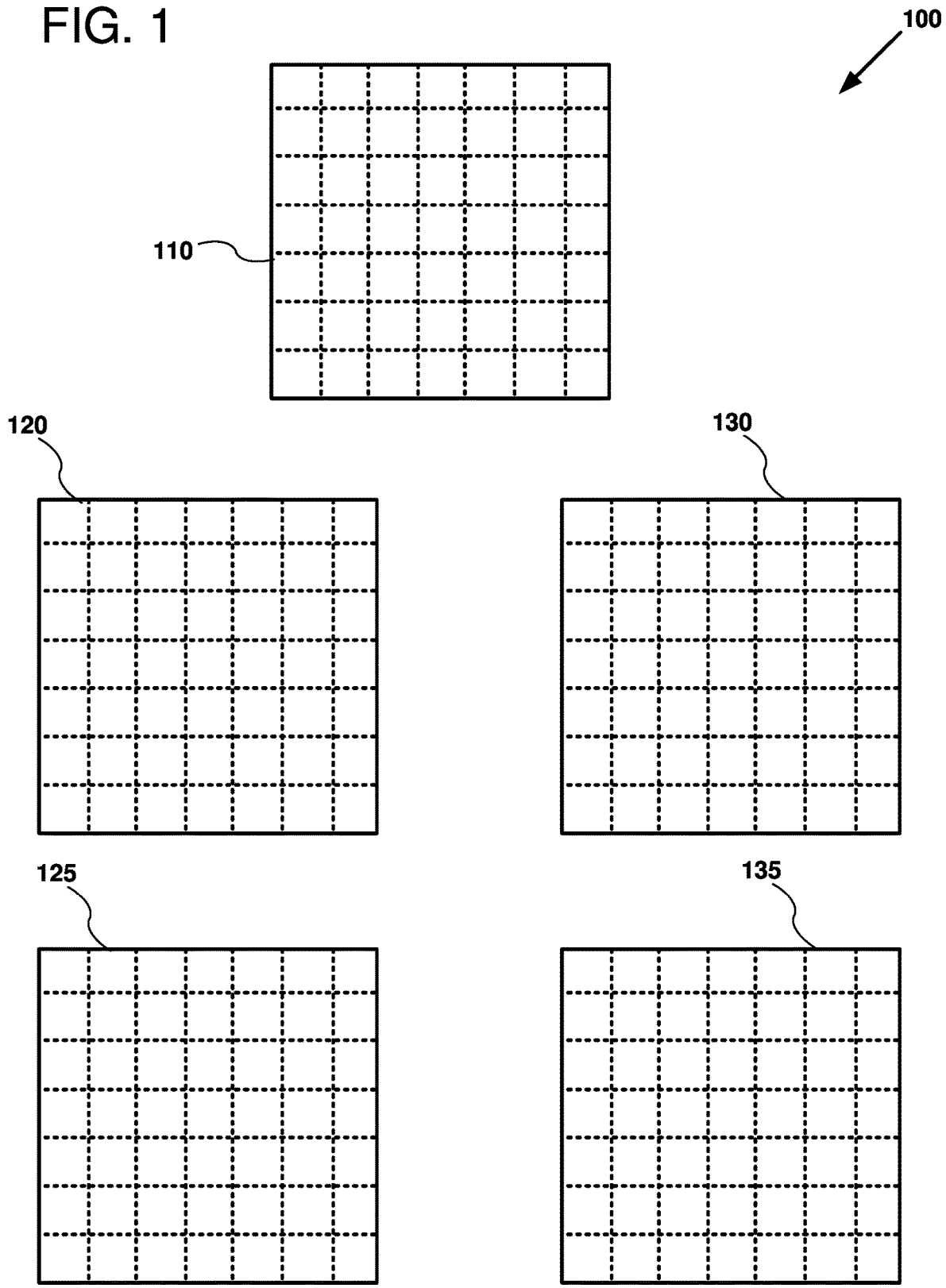
FIG. 1 is a diagram illustrating an example of naïve pattern matching with a pattern classification tool.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Some of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as computer-readable instructions executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Naïve Example of Pattern Matching

FIG. 1 is a diagram 100 illustrating an example of naïve pattern matching that can be performed with a pattern classification tool. As shown in FIG. 1, a 7×7 reference pattern 110 includes a layout pattern of interest on a single layer, with a 3×3 square of positive layer values surrounded by negative layer values. In VLSI layout tools, patterns are represented by portions of layout that are either present (positive) or not present (negative). Different layers in an integrated circuit can be represented by assigning polygons to different layer numbers. In some examples, a layer can have more than two possible values, although for ease of explanation, the examples disclosed herein discuss binary layout values.

Also shown in FIG. 1 are two portions 120 and 130 of layout that will be compared to the reference pattern 110. An XOR operation can be performed between the reference pattern 110 and each of the layout portions 120 and 130, resulting in XOR outputs 125 and 135, respectively. One way to compare the layout portions to the reference pattern is by summing the area of difference between the patterns using the result of the XOR operation. The XOR outputs 125 and 135 have shaded squares where there are differences (in other words, a square of the grid is positive in the reference pattern but not in the compared layout portion, or vice versa) between the reference pattern 110 and the layout portions 120 and 130 that are being compared. However, as shown the relative area of the 2 XOR outputs 125 and 135 is the same. For lithography or design for manufacturing purposes however, the first layout portion 120 is much more similar to the reference pattern 110 than the second layout portion 130. Thus, comparing the area of XOR output does not provide much insight into how similar a particular layout portion is to a reference pattern. Such naïve forms of pattern matching offer ample opportunity for improvement.

Example Method of Pattern Decomposition for Pattern Analysis

Figure 2:
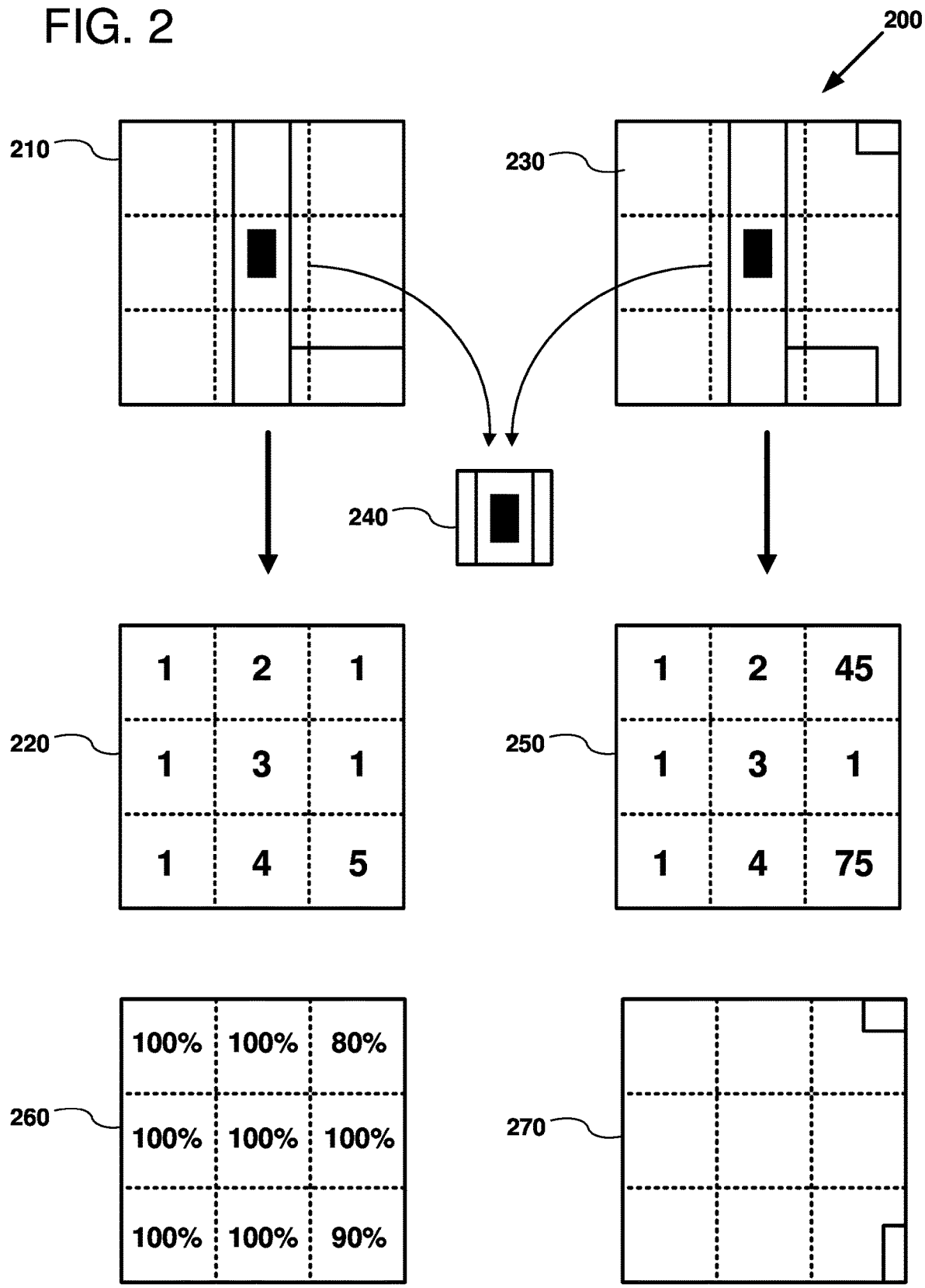
FIG. 2 is a diagram illustrating operations performed on a reference pattern as can be performed in certain examples of the disclosed technology.

FIG. 2 is a diagram 200 illustrating operations performed on a reference pattern and a layout of interest as can be performed in certain examples of the disclosed technology. For example, the methods outlined below regarding FIGS. 13-15 can be used to perform some of the operations illustrated in FIG. 2. The illustrated operations can be used to perform pattern grouping based on a matching rate predetermined for sub-patterns of an original pattern.

A layout for a reference pattern 210 is shown. The reference pattern 210 includes a first L-shaped layer and a smaller rectangular shape on a different layer. The reference pattern is divided into nine sub-pattern areas. Each of the reference sub-pattern areas is associated with a unique sub-pattern identifier, as shown in the signature pattern 220. Since five of the sub-patterns are identical, these have been assigned to the same reference number, 1. The other four sub-patterns in the reference pattern are different from each other, so each is associated with a different sub-pattern identifier: 2, 3, 4, and 5.

A portion of a layout of interest 230 is also shown. The layout of interest 230 includes layout shapes on the same two layers as the reference pattern 210, as shown. The layout of interest 230 is decomposed into nine sub-patterns for further analysis. The center sub-pattern 240 is an exact match between the reference pattern and the layout of interest 230. Thus, examples of the disclosed method that are based on a center anchor pattern can be determined, because the anchor sub-pattern is used as a reference to look for matching patterns based on surrounding sub-patterns.

A signature 250 of the layout of interest 230 is also shown. As shown, for of the sub-pattern regions are exact matches for sub-pattern 1 (which has no data on the two layers). Three of the sub-patterns having data for these particular layers, sub-patterns 2, 3, and 4 are exact matches to the reference signature pattern 220. However, two of the sub-patterns in the layout of interest 230 do not match the reference pattern 210. These two sub-patterns have been assigned to new sub-pattern identifiers, numbers 45 and 75. Thus, the layout pattern of interest 230 is not an exact match to the reference pattern 210.

Also shown in FIG. 2 is a comparison 260 of the degree of matching between the reference pattern 210 and the layout of interest 230. As shown, seven of the sub-patterns are exact matches, in other words, 100% of the area of the layers in the sub-pattern are matching. The two non-matching sub-patterns, do match 80% and 90%, respectively of their layout layer areas to the reference pattern. These percentages can be used to determine the degree of partial matching. In other examples, numbers of vertices, amount of perimeter, area, density, or other metrics can be used to compare sub-patterns and an associated degree of partial pattern matching.

Also shown in FIG. 2 is an example XOR output 270 showing the differences between the layout of interest 230 and the reference pattern 210. As shown, only the portions of the two patterns that are not identical are displayed. This can assist a user or a layout verification tool in performing further operations using the partially matched patterns.

Alternative Example Method of Pattern Decomposition for Pattern Analysis

Figure 3:
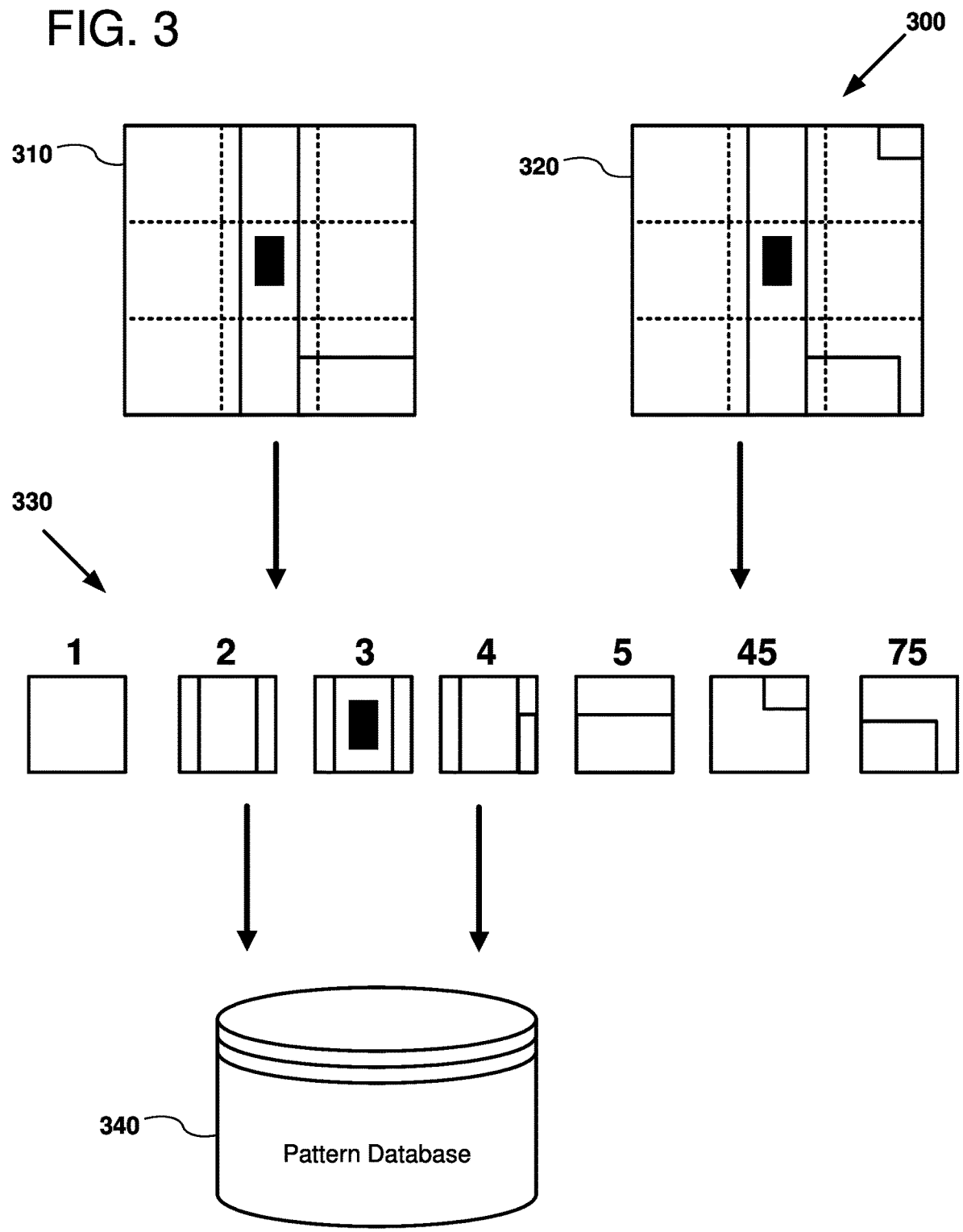
FIG. 3 as a diagram illustrating an example of decomposing layout patterns into sub-patterns, as can be performed in certain examples of the disclosed technology.

FIG. 3 is a diagram 300 illustrating an example of decomposing layout patterns into sub-patterns and storing in a pattern database or stored in memory device, as can be performed in certain examples of the disclosed technology. In the illustrated example, a first reference pattern 310 and a second reference pattern 320 will be decomposed into groups of sub-patterns 330 and stored in a pattern database 340. In some examples, the pattern database stores an original, non-decomposed representation and decomposition occurs during pattern matching, where sub-patterns and associated signatures are created and stored in memory for use in puzzle matching.

The first reference pattern 310 is decomposed into groups of sub-patterns on a 3×3 grid. Some of the sub-patterns are unique for the first reference pattern, while other sub-patterns are duplicated. For the first reference pattern 310, there are five empty sub-patterns, which are all mapped to the same sub-pattern labeled 1. There are also four other sub-patterns labeled 2, 3, 4, and 5. Each of the sub-patterns 1-5 is associated with a canonical signature. In other words, for other patterns that are decomposed into sub-patterns, identical layout regions corresponding to a sub-pattern should always map to the same sub-pattern label or signature. The label or signature can be formed in a number of different ways. For example, the label or signature can be an ordered list of vertices of polygons in the sub-pattern. In some examples, the label or signature is a hash of layout information in the sub-pattern. Some examples, label or signature is modified with a hash function, and the hash function is used as the label or signature.

The second reference pattern 320 will also be decomposed into a number of unique sub-patterns. In the illustrated example, the second reference pattern 320 is decomposed to sub-patterns labeled 1, 2, 3, 4, 45, and 75. The layout signatures and associated labels are stored in a pattern database 340 for use in puzzle matching. In some examples, the pattern database stores an original, non-decomposed representation and decomposition occurs during pattern matching, where sub-patterns and associated signatures are created and stored in memory for use in puzzle matching.

As will be readily apparent to one of ordinary skill in the relevant art having the benefit of the present disclosure, large numbers of input patterns can be decomposed to generate a large number of sub-patterns that will be stored in the pattern database 340. In some examples, the patterns are selected manually by an engineer or technician as being a pattern of interest. In some examples, the patterns are selected using a DRC flow to identify regions of interest and actual production layouts. In some examples, the patterns are selected using a DFM flow to identify regions of interest and actual production layouts. In some examples, the layout patterns are identified in part on identifying an anchor sub-pattern. In the illustrated example, sub-pattern 3 might be an anchor sub-pattern, because it is associated with a via. Because vias are often sensitive to surrounding layout in the photolithography and manufacturing process, such areas a layout or more likely to be of interest. Hence, the via sub-pattern 3 is used to anchor the layout pattern. Further, the number of sub-patterns that a pattern is decomposed into can vary. Thus while the illustrated example shows the pattern being decomposed into nine sub-patterns, more or fewer sub-patterns can be generated. In some examples, the size of the pattern is fixed, while in other examples, the size of the pattern may be variable. Further, the size of the sub-pattern regions may be variable or fixed, depending on a particular implementation. In some examples, the size of the layout pattern may vary depending on the mask layers associated with a particular pattern. For example, higher layer metals often have a larger pitch and so a larger pattern area is more desirable than for lower metal layers which often have a smaller pitch.

Example Method of Pattern Signature Generation for Pattern Analysis

Figure 4:
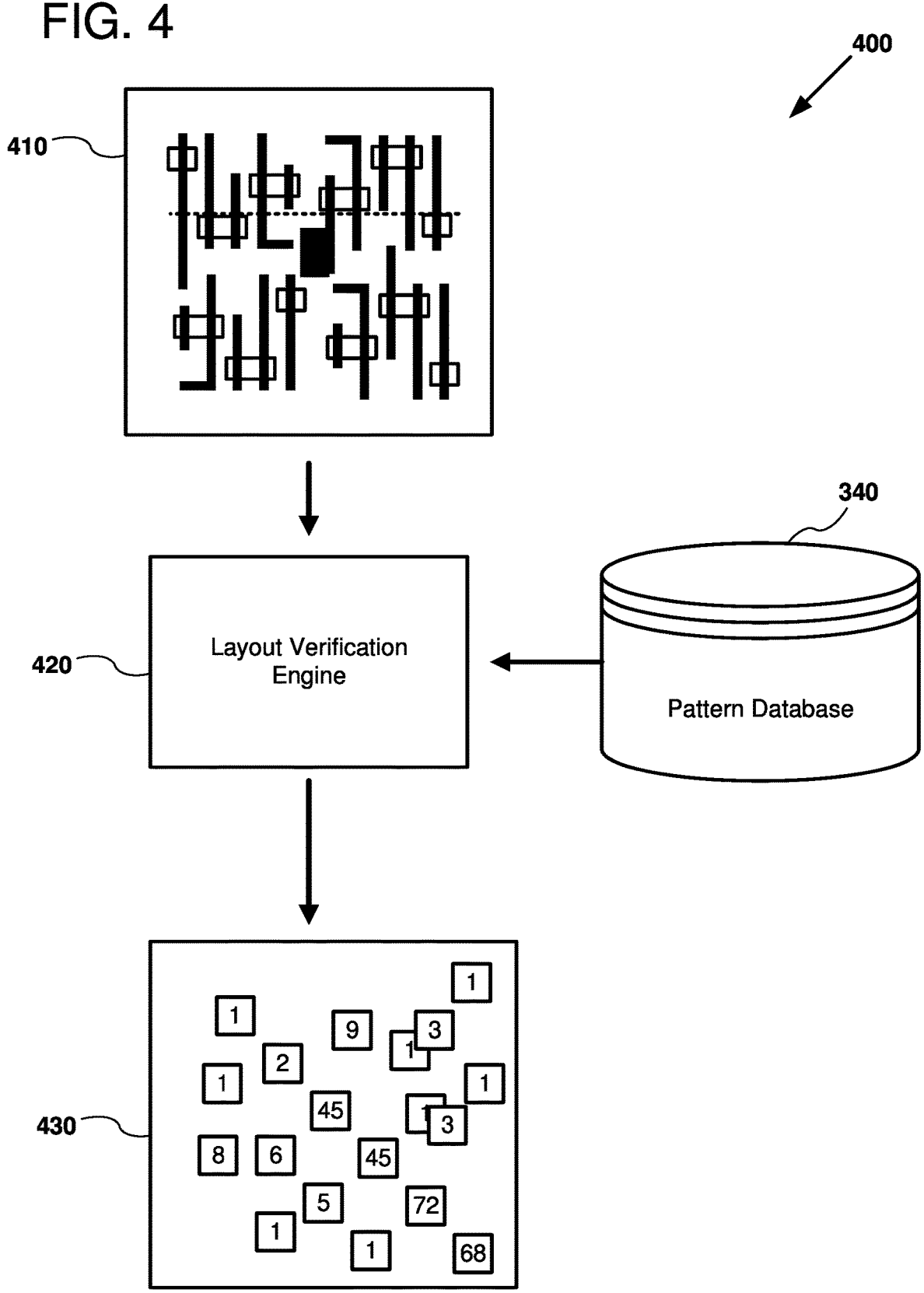
FIG. 4 is an example of pattern signature generation, as can be performed in certain examples of the disclosed technology.

FIG. 4 is a diagram 400 illustrating an example of pattern signature generation, as can be performed in certain examples of the disclosed technology. As shown, an input layout design 410 is provided to a layout verification engine 420. The layout verification engine 420 is coupled to the pattern database 340 that was discussed above. The layout verification engine 420 generates signatures for the input layout design 410, which are output as a set of identified layout sub-patterns 430.

The input layout design 410 is for all or a portion of an integrated circuit design. In some examples, a portion of an integrated circuit called a unit or block is provided to the layout verification engine 420. In other examples, a layout for an entire integrated circuit is provided. In some examples, only certain layers of the layout design and a provided, while in other examples, all of the layout layers are provided. Examples of suitable formats for storing information for the input layout design 410 include proprietary formats such as OASIS by Mentor Graphics, Virtuoso by Cadence, or Milkyway by Synopsys, or defacto industry standard formats, such as LEF/DEF or GDSII.

In some examples, the layout verification engine 420 is a proprietary software product such as Calibre by Mentor Graphics, Hercules by Synopsys, or Pegasus by Cadence. A tool developer can write runsets describing layer operations performed by the layout verification engine 420. The runset can be used to identify sub-patterns from the pattern database 340 in the provided input layout design 410. When the runset is executed by the layout verification engine 420, the output set of identified layout sub-patterns can be stored in any suitable output format. In the illustrated example, the identified sub-patterns are provided in the output with an associated label (e.g., 1, 2, 9, 45, 72, etc.) and position of the identified sub-pattern within the input layout design 410 (e.g., expressed in x-y coordinates). For example, the identified sub-patterns can be output as polygons (e.g., rectangles or more complex polygons) on one or more output layers in a layout file in OASIS or GDSII format. The associated label or signature can be placed on a text layer associated with the polygons in the output layout file. In some examples, the associated labels are arbitrarily assigned, without consideration for the shapes in the layout sub-pattern. In other examples, the associated label can be a signature, which is generated taking into account shapes within the layout sub-pattern. For example, the signature may be generated by combining information about vertices of polygons within the layout sub-pattern. It is often desirable, though not required, that the label of each sub-pattern be canonical. In other words, when a layout sub-pattern is always associated with the same label for a given pattern database 340, the label is said to be canonical. Thus, for every instance of the layout sub-pattern within and input layout design, an identical label will be associated with the layout sub-pattern.

Example Method of Origin Identification for Pattern Analysis

Figure 5:
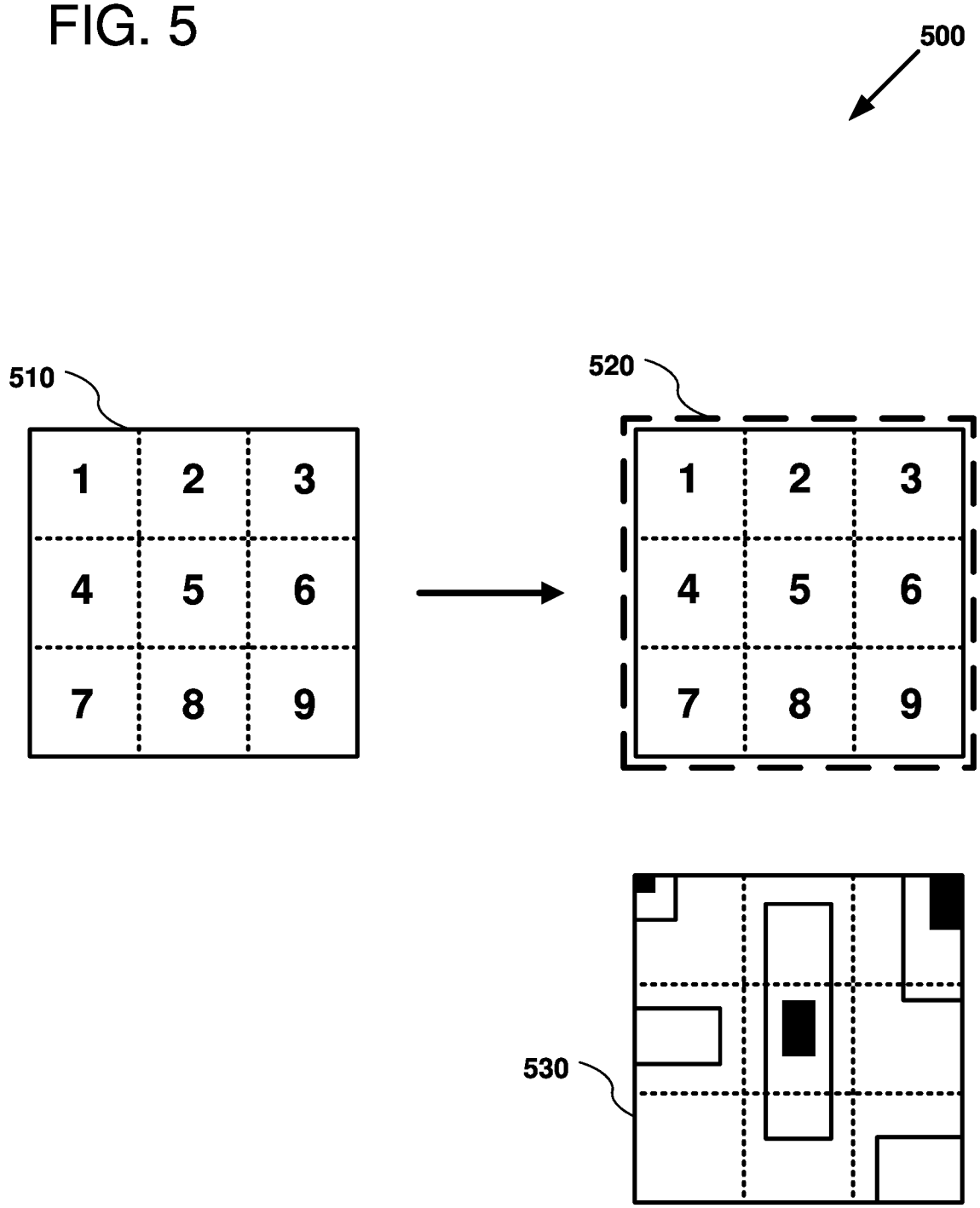
FIG. 5 as a diagram illustrating an example of origin identification, as can be performed in certain examples of the disclosed technology.

FIG. 5 is a diagram 500 illustrating an example of origin identification, as can be performed in certain examples of the disclosed technology. In the illustrated example, a new pattern is created that has ten pattern layers by capturing the marker layer output by the nine sub-patterns during signature generation, for example as described above regarding FIG. 4. In this operation, a set of nine marker layers in the pattern 510 generated by the layout verification tool are combined with a bounding box 520 of the entire source pattern. By combining the nine sub-patterns with the bounding box 520, a geometry that is identical to the original pattern 530 is created.

Figure 6:
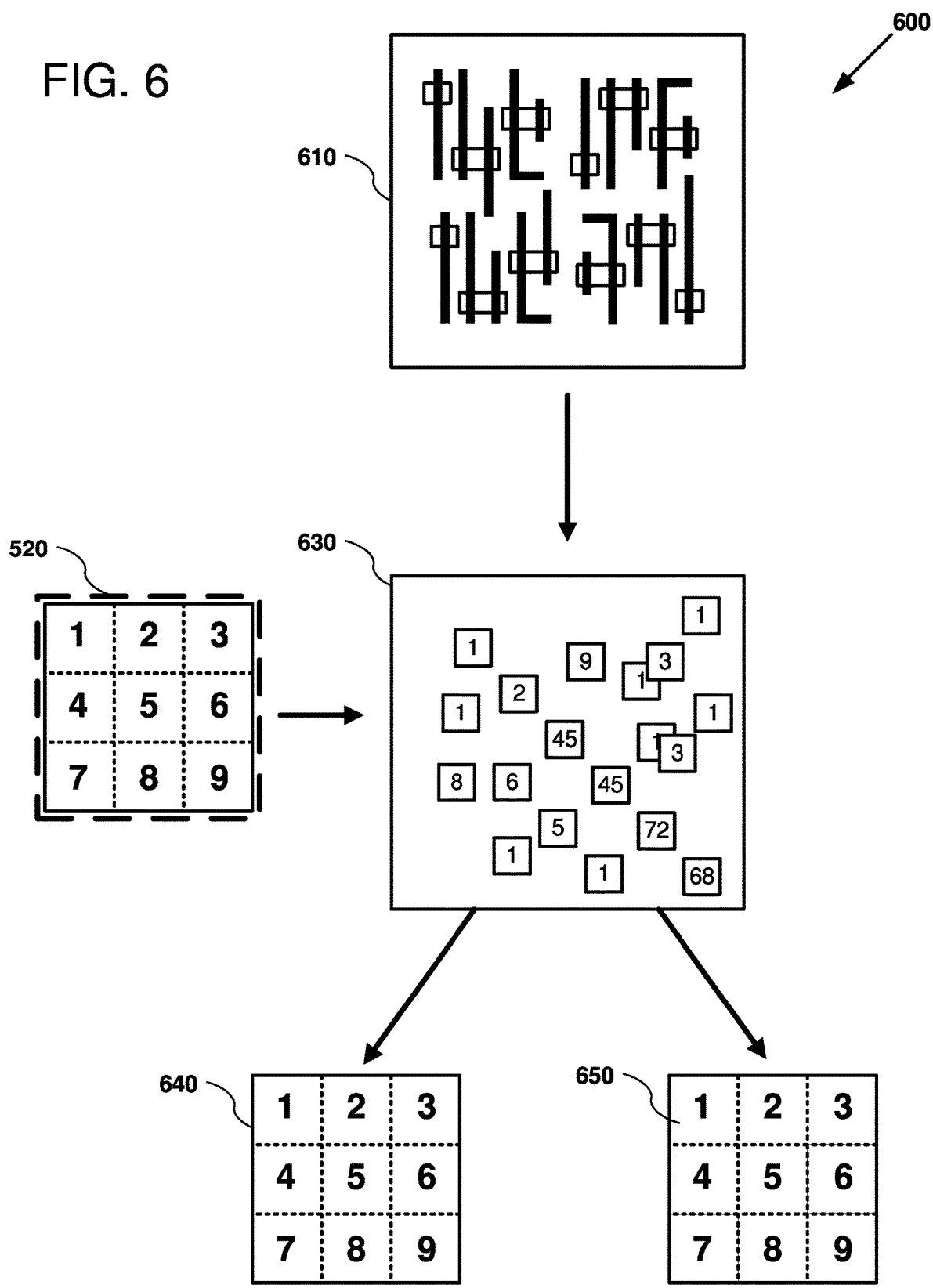
FIG. 6 is a diagram illustrating an example of searching for patterns in an input layout design, as can be performed in certain examples of the disclosed technology.

Example Method of Searching for Puzzle Matching for Identical and Similar Patterns FIG. 6 is a diagram 600 illustrating an example of searching for identical and similar patterns in an input layout design, as can be performed in certain examples of the disclosed technology. A layout verification engine performance partial mapping on an input layout design.

As shown in FIG. 6, an input layout 610 is provided and a layout verification engine executes partial matching for individual sub-patterns. A number of sub-patterns are indicated (e.g., labeled 1, 2, 3, 45, 72, etc.) in a partially matched layout 630. Partial matching is performed using a pattern 520 from the pattern database that includes the bounding box within the partially matched layout 630. A number of different layout patterns 640 and 650 can then be identified. The first layout pattern 640 is an exact match. In other words, all nine sub-patterns were identified in the partially matched layout 630 arrange the same way as in the test pattern 520. The second layout pattern 650 is a partial match. In this example, seven of the sub-patterns were an exact match to the test pattern 520 (labeled 1, 2, 3, 4, 5, 8, and 9). Two of the sub-patterns were not exact matches (labeled 6 and 7). In some examples, the partial match requires some degree of matching between the partial match sub-pattern and the test pattern. In other examples, no degree of matching is required between a partial matched sub-pattern and the test pattern. In some examples, a certain number of sub-patterns are required to be exact matches to form a partial match to the test pattern. In some examples, the position of the sub-patterns is significant to the matching process. For example, a pattern match to the test pattern may require an exact match for sub-pattern 5, but not require exact matches for sub-patterns at the corners (labeled 1, 3, 7, and 9).

Example Method of Partial Puzzle Pattern Matching

FIG. 7 is a diagram 700 illustrating an example method of performing partial matching, as can be performed in certain examples of the disclosed technology. As shown in FIG. 7, there is a single test pattern 710. The pattern matching tool is configured to require a fixed center and a general tolerance of 90%. There are three layout patterns 720, 730, and 740 that have been identified in a layout designs are being compared to the test pattern 710.

The first layout pattern 720 is compared to the test pattern 710. This first layout pattern is not a match, because there are to layout sub-patterns labeled 4 and 7 that are less than a 90% match. The degree of a match can be determined in a number of different ways. For example, a layout being compared to a sub-pattern in the sub-pattern layout can be XORed, and a percentage of the XOR output area as a percent of the total sub-pattern layout area can be calculated. Other suitable metrics can be used for the comparison, for example by comparing a number of matching or degree of closeness of vertices in a layout being compared and a sub-pattern layout. Two of the portions of the first layout pattern 720 (labeled 2 and 4) would not prevent matching, because although they are not identical, there match percent satisfies the tolerance level of 90%.

The second layout pattern 730 is a partial match. This is because all of the associated portions of the second layout pattern 730 are either identical matches, or partial matches satisfying a predetermined tolerance level (portions 2 and 4). Thus, the second layout pattern 730 satisfies the criteria for a partial match in this example. The third layout pattern 740 is not a partial match. This is because the center layout portion, labeled 5, does not meet a predetermined tolerance level of 90%.

Alternative Example Method of Partial Puzzle Pattern Matching

Figure 8:
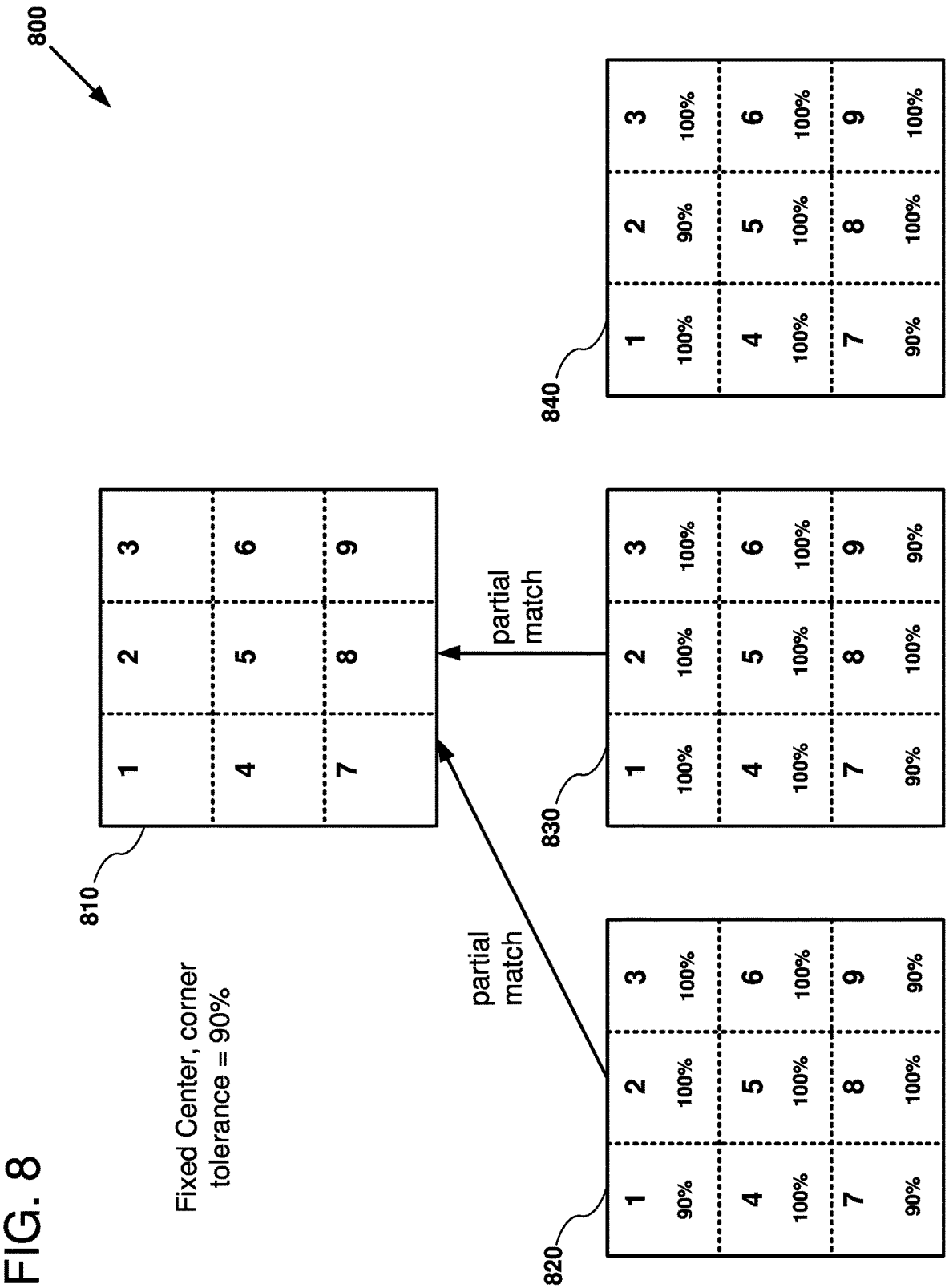
FIG. 8 is a diagram illustrating an example method of performing partial matching on layout patterns using a corner tolerance value, as can be performed in certain examples of the disclosed technology.

FIG. 8 is a diagram 800 illustrating an example method of performing partial matching on layout patterns using a corner tolerance value. As shown in FIG. 8, a test pattern 810 is compared to a number of different layout patterns 820, 830, and 840. In this example, the first two layout patterns 820 and 830 are partial matches to the test pattern 810 because each pattern exactly matches the test pattern, with the exception of sub-patterns located on the corners of the respective layout patterns. For example, the first layout pattern 820 has partial matches on corner sub-patterns labeled 1, 7, and 9. Each of these sub-patterns meets the tolerance for the example of 90%. Similarly, layout pattern 830 is a partial match to the test pattern 810 because it has sub-patterns within the 90% tolerance. The third layout pattern 840, however, is not a valid partial match under the parameters of this example. This is because a non-corner sub-pattern, sub-pattern 2 is a 90% match to the test pattern 810, but, since it is not located on the corner is not designated as a partial match. Thus, using a corner tolerance matching scheme as in this example can allow for more tolerance of differences in layout away from the center sub-pattern 5. In other examples, different methods of determining a match or a preferred match can be used. For example, in the example of FIG. 8, layout pattern 830 can be designated as a preferred match due to its higher sub-pattern match rate. Some examples, other metrics such as the sub-pattern match rate, percentage of sub-patterns, etc. is used to determine a best match output.

Example Method of Pattern Generation for Pattern Analysis

FIG. 9 is a diagram 900 illustrating an example of uniform pattern generation, as can be performed in certain examples of the disclosed technology. In the illustrated example, a nine-unit by nine-unit portion of layout 910 is assessed for pattern generation. The layout 910 is divided into a group 920 of sub-patterns including three rows and three columns. Each sub-pattern has the dimensions of three units by three units. In some examples, when vertices of the layout 910 coincide with the boundaries of the pattern region, the layout 910 may be shifted in order to keep vertices from being coincident with the pattern or sub-pattern area edge. In other examples, each of the illustrated sub-patterns can be slightly overlapped to improve coverage, and avoid issues when there are layout object vertices coincident with the sub-pattern edge.

FIG. 10 is a diagram 1000 illustrating an example of non-uniform pattern generation, as can be performed in certain examples of the disclosed technology. The illustrated example, a five unit by five unit portion of layout 1010 is assessed for pattern generation. Since the minimum unit size for this example is one, the layout 1010 is divided into a group 1020 of sub-patterns including three rows and three columns. However, the rows and columns do not have uniform width and height. In particular, as shown, there are four sub-pattern units that are 2×2 units, one sub-pattern that is one by two units, one sub-pattern that is to by one units, and one sub-pattern that is one by one unit.

Figure 11:
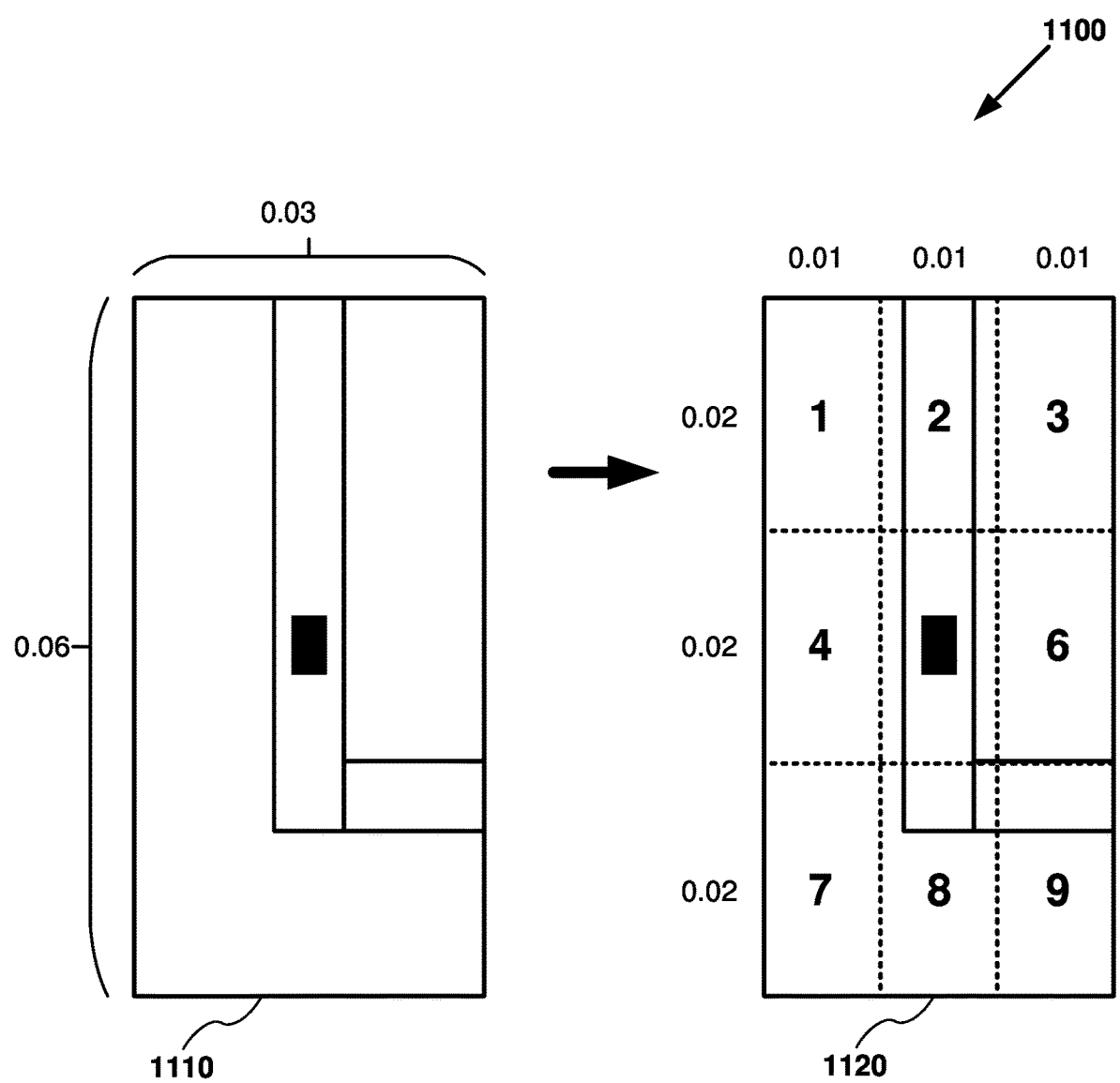
FIG. 11 is a diagram illustrating an example of nonuniform pattern generation, as can be reported certain examples of the disclosed technology.

FIG. 11 is a diagram 1100 illustrating an example of nonuniform pattern generation, as can be performed in certain examples of the disclosed technology. In the illustrated example, a layout 1110 is provided that has dimensions 0.03×0.06. Since the dimensions of the layout 1110 are not uniform, the layout 1110 is divided into a group 1120 of sub-patterns that have dimensions 0.01×0.02.

Figure 12:
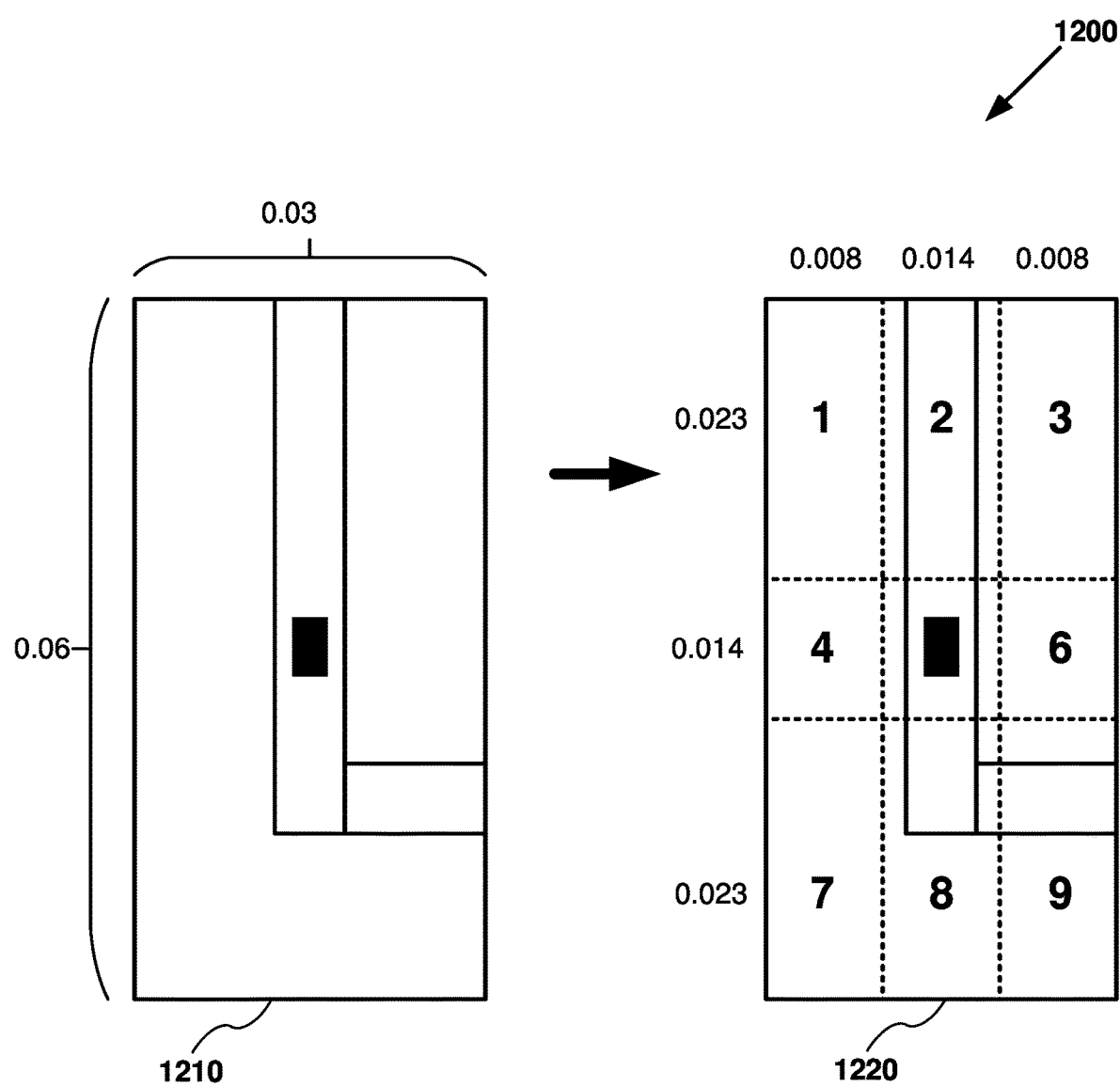
FIG. 12 is a diagram illustrating an example of nonuniform pattern generation, as can be performed in certain examples the disclosed technology.

FIG. 12 is a diagram 1200 illustrated example of nonuniform pattern generation, as can be performed in certain examples of the disclosed technology. In the illustrated example, a layout 1210 is provided that has dimensions 0.03×0.06, similar to the example of FIG. 11. In this example, however the shapes of the sub-patterns in the group 1220 of sub-patterns is waited so that the center sub-patterns have smaller dimensions. Thus, the center sub-pattern labeled 5 has dimensions 0.014×0.014. The side sub-patterns labeled 2, 4, 6, and 8 each have one side of dimensions 0.014, and another side of dimension either 0.008 or 0.023 as shown. The corner sub-patterns labeled 1, 3, 7, and 9 also have different dimensions as shown. Thus, it is possible to use sub-patterns that have center sub-patterns with different dimensions than side or corner sub-patterns.

Example Method of Hot Spot Analysis Using Puzzle Matching

Figure 13:
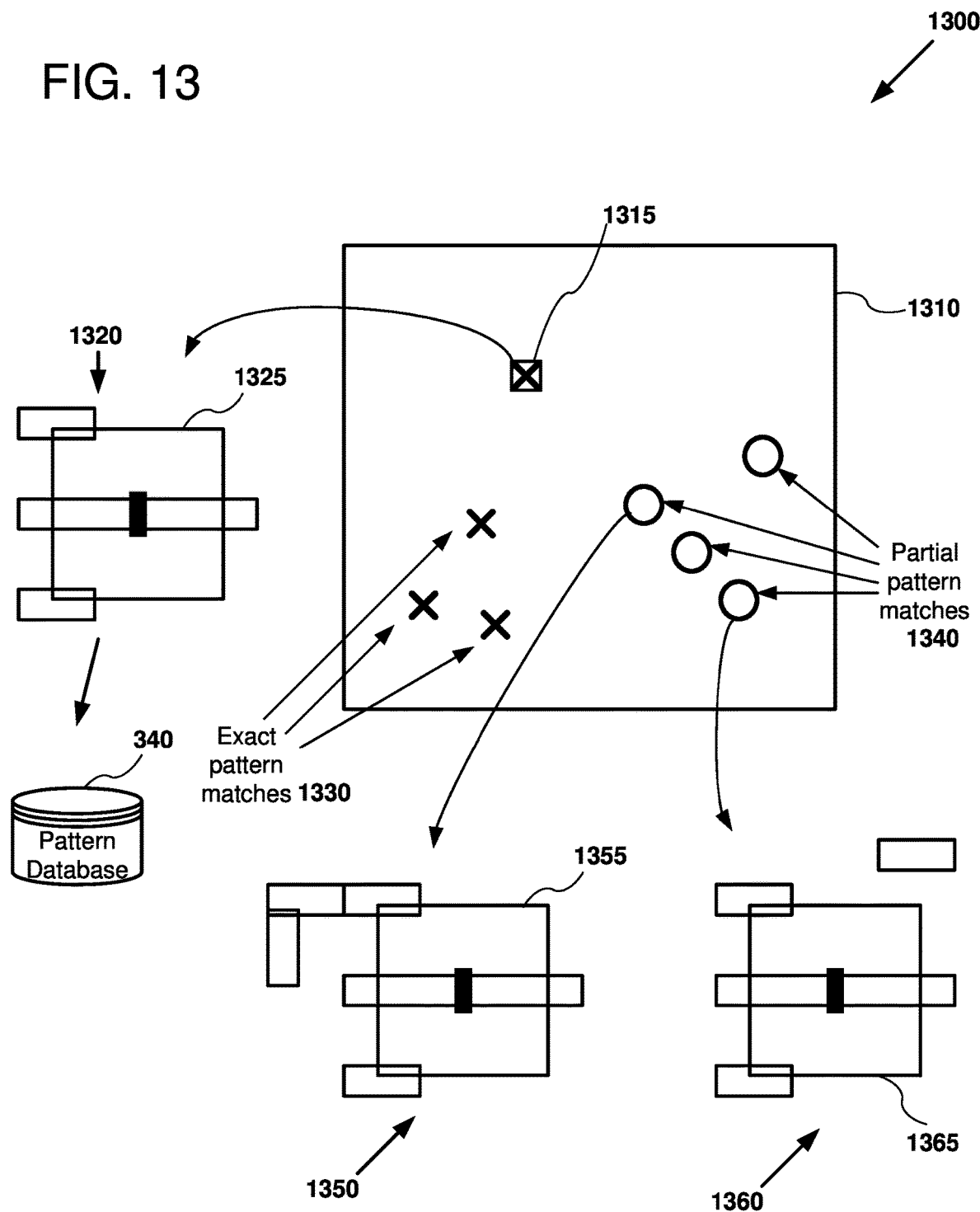
FIG. 13 is a diagram illustrating an example method of performing hotspot analysis using exact and partial puzzle matching techniques, as can be performed in certain examples of the disclosed technology.

FIG. 13 is a diagram 1300 illustrating an example method of performing hotspot analysis using exact and partial puzzle matching techniques, as can be performed in certain examples of the disclosed technology. For example, techniques discussed above regarding FIGS. 2, 3, and 5, implemented using computer system such as those discussed below regarding FIGS. 17 and 18 can be used to perform the illustrated method.

As shown in the diagram 1300, a layout design 1310 has been analyzed using a lithography hotspot detection tool. A first hotspot 1315 is detected in the layout. A portion of the hotspot 1320, including a center sub-pattern 1325 of the hotspot it shown in FIG. 13 enlarged. The identified hotspot pattern has three rectangles on a first layer (e.g., a metal layer) and another rectangle on a second layer (e.g., a via layer). This relatively simple example is shown for ease of explanation, however, additional numbers of layers having more complex patterns can be adapted to the example. A signature pattern indicating layout sub-patterns for the identified hotspot 1320 are stored in the pattern data base 340, such as that discussed above regarding FIG. 3.

A showing of the diagram 1300, there are a number of exact pattern matches 1330 in the layout design 1310. There are also a number of partial pattern matches 1340, for example, partial matches 1350 and 1360. As shown, each of the partial matches 1350 and 1360 has an exact match to the hotspot 1320 within their respective center sub-pattern regions 1355 and 1365. However, the layout surrounding the center sub-pattern region is a partial match to the original pattern.

In practice, manufacturing operators can use exact and partial matching results such as shown in FIG. 13 to better understand conditions under which there are manufacturing failures. For example, those areas where there are exact match locations can provide insight as to whether there is a systematic failure in the manufacturing process. The similar match locations can provide insight on the impact of surrounding pattern context. Thus, data generated by a pattern generation and puzzle matching tool can be used to improve the manufacturing process by addressing causes of layout design hotspots. Further, the use of systematic partial puzzle matching as disclosed herein can readily provide contextual pattern matching, without requiring customization of individual patterns.

Example Method of Sub-Pattern Generation for Pattern Analysis

Figure 14:
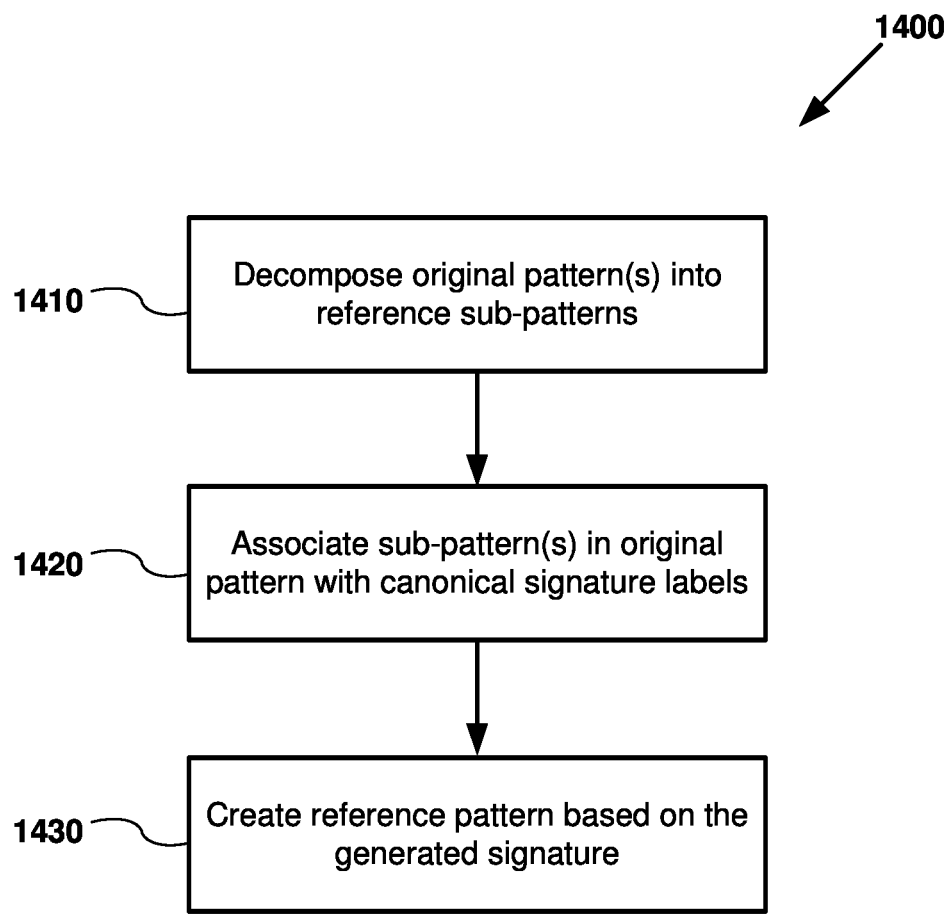
FIG. 14 is a flowchart outlined an example method of sub-pattern generation, as can be performed in certain examples of the disclosed technology.

FIG. 14 is a flow chart 1400 outlining an example method of sub-pattern generation, as can be performed in certain examples of the disclosed technology. For example, techniques discussed above regarding FIGS. 2, 3, and 5, implemented using computer system such as those discussed below regarding FIGS. 17 and 18 can be used to perform the illustrated method.

At process block 1410, one or more original patterns are decomposed into reference sub-patterns. The original patterns can be identified a different number of ways. For example, a user may provide selected patterns of interest as the original patterns. In some examples, the original patterns can be generated by a layout analysis tool, such as a tool for DFM or OPC. In particular, portions of layout that appear to be hot spots, that detract from yield and/or performance of an integrated circuit can be selected as patterns of interest in a set of original patterns. A bounding box for each original pattern is selected, relative to an origin or center of the original pattern. For example, the center of a hotspot may be selected as the center of the original pattern. The original pattern is then decomposed into a number of reference sub-patterns. For example, in the examples above, original patterns were decomposed into a 3×3 grid of nine sub-patterns.

At process block 1420, the decomposed sub-patterns are identified for the original patterns. In other words, a canonical label is selected for each of the sub-patterns. This way, each sub-pattern will be associated with the same label, regardless of the original pattern from which the sub-pattern came. For example, FIG. 3 illustrates an example of two original patterns 310 and 320 that have been decomposed into sub-patterns, which have been associated with a unique, canonical label.

At process block 1430, signatures for the original patterns are generated based on the associated sub-pattern labels. For example, each original layout can be described using a sequence of labels for the canonical sub-patterns. In addition, an additional layer for the bounding box of the original pattern is provided and combined with the sub-pattern labels to form to form a reference pattern for each original pattern. In some examples, a single reference pattern is generated for each original pattern. In other examples, transformed versions of the original pattern are generated for rotated and/or flipped orientations of the original pattern. The reference patterns can be stored in a signature database for use by a puzzle matching tool.

As will be readily understood one of ordinary skill in the relevant art having the benefit of the present disclosure, a number of variations of parameters and techniques can be used to perform sub-pattern generation. For example, the number of sub-pattern windows, and dimensions of such windows can be varied. In some examples, sub-pattern generation is performed with a fixed sub-pattern window. In some examples, matching to a sub-pattern requires an exact match to the layout within a sub-pattern portion (e.g., an exact match to sub-pattern 5 of pattern 510). In some examples, the dimensions of the center sub-pattern can be enlarged or reduced relative to other sub-patterns.

Example Method of Puzzle Matching

Figure 15:
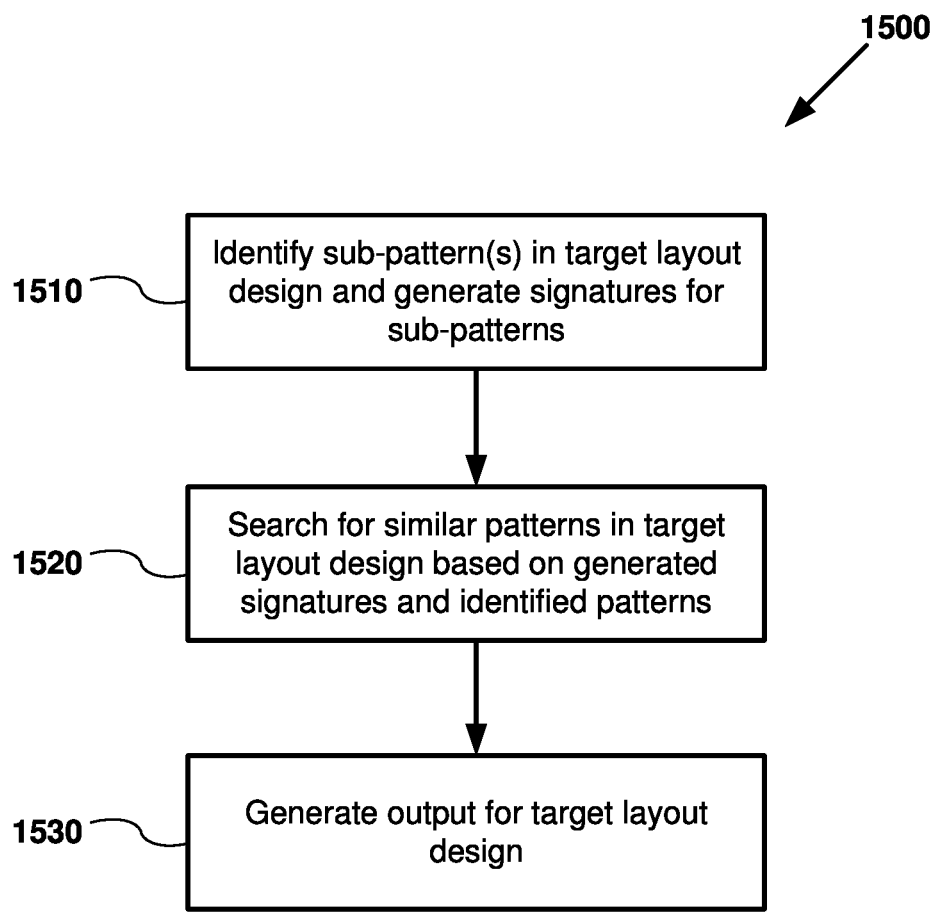
FIG. 15 is a flowchart outlining an example method of puzzle matching, as can be performed in certain examples of the disclosed technology.

FIG. 15 is a flow chart 1500 outlining an example method of puzzle matching as can be used in certain examples of the disclosed technology. For example, the techniques discussed above regarding FIGS. 4, 6, 7, and/or 8 can implemented using computer system such as those discussed below regarding FIGS. 17 and 18 can be used to perform the illustrated method.

At process block 1510, a number of sub-patterns in a layout design are identified. For example, layout verification engine can be used with a runset to identify sub-patterns in a target layout design. The sub-patterns that are identified are associated with signatures or labels in a pattern data base.

At process block 1520, the generated signatures from process block 1510 are used to search for patterns in the layout design. For example, combinations of sub-patterns that are located next to one another in the layout design can be associated with one or more patterns. In some examples, all of the sub-patterns for a pattern must be identical match in order for a match to be made. Some examples, only a center sub-pattern of the pattern is required to be an exact match, and surrounding sub-patterns can be matched based on the tolerance value. In some examples, corner sub-patterns have a lower level of tolerance than side or center sub-patterns. In some examples, a predetermined number of sub-patterns are to be matched to a pattern before being designated as matching.

At process block 1530, output for patterns that were identified in the target layout process block 1520 is generated. In some examples, the output provided is in the form of a layout file containing polygons for differences between a reference pattern and the layout pattern identified in the target layout design. In some examples, the output as provided in the form of a marker layer that identifies locations of where certain patterns have been identified in the target layout design. In some examples, the generated output includes text, for example text layers in an output OASIS or GDSII files, or a separate text file listing information about found layout patterns in the target layout design. In some examples, the output is sorted so that instances of patterns with the most number of matches can be distinguished from other patterns with fewer number of matches.

As will be readily understood one of ordinary skill in the relevant art having the benefit of the present disclosure a different number of variations of parameters and techniques can be used for puzzle classification. For example, a description of the layer or layers to use for context for a pattern can be specified. A description of the layer to use as an anchor layer for matching patterns can be specified. For example, a layer used in a center sub-pattern can be specified in sub-patterns including that anchor layer plus one or more additional layers can be specified. In some examples, puzzle matching cameras require an exact match to a center sub-pattern. In other examples, puzzle matching does not require an exact match to a center sub-pattern. In some examples, a Range of tolerance can be specified for center sub-patterns, side sub-patterns, or corner sub-patterns. For example, tolerance values specified an exact match for the center, a close match for side sub-patterns (e.g., 80 or 90%), and no match or low match for corner sub-patterns can be specified (e.g. ranging from 0 to 90%). In some examples, tolerance can be specified as a number of sub-patterns that do not match the pattern or do not meet specified tolerance value for a sub-pattern. In some examples, tolerance of corner sub-patterns can be specified separately from tolerance for other sub-patterns were tolerance for the center sub-pattern.

Figure 16:
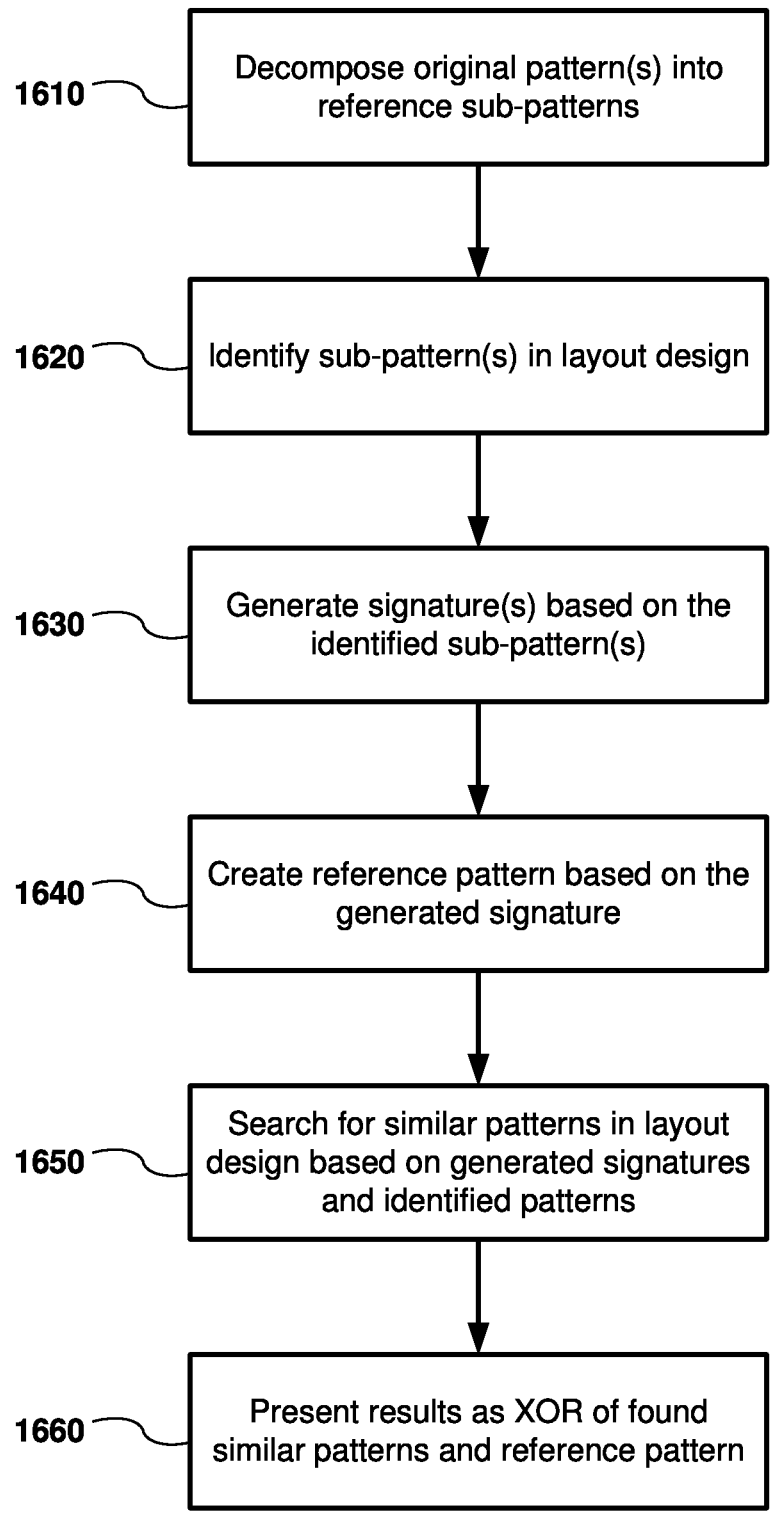
FIG. 16 is a flowchart outlining an example of performing pattern matching, puzzle-based pattern matching, and pattern classification for an integrated circuit layout design, as can be performed in certain examples of the disclosed technology.

Example Methods of Pattern Matching, Puzzle-Based Pattern Matching, and Pattern Classification FIG. 16 is a flow chart 1600 outlining an example method of performing pattern matching, puzzle-based pattern matching, pattern classification for an integrated circuit layout design. For example, any of the computing systems disclosed herein can be used to implement the outlined method on data representing an integrated circuit layout.

At process block 1610, one or more original layout patterns are decomposed into a number of reference sub-patterns. For example, an original pattern can be decomposed into 9 squares having identical width and height. In other examples, non-square rectangles, other shapes, or other arrangement of sub-pattern windows can be used. Layout within the sub-pattern portion of the original pattern is identified and stored in a library for future comparison. In some examples, one or more layers of integrated circuit layout data located within the sub-pattern window portion of the original pattern are stored as a sub-pattern in the pattern library. In some examples, a percentage of area or a number of vertices, or an amount of perimeter is stored as the sub-pattern in the pattern library. Desirably, each of the sub-patterns is canonical; in other words, an identical sub-pattern found in another layout pattern will exactly match to the same sub-pattern in the pattern library. The original one or more patterns from which the sub-pattern library is built can be identified a number of different ways. For example, a design or manufacture (DFM) tool can be used to identify hot spots or other portions of a layout that have yield concerns. In some examples, a runset for a layout verification tool can use a series of functions defined in the tool, including DRC rules, to identify original patterns. In some examples, data from yield analysis of an integrated circuit test chip can be used to identify original patterns. In some examples, a designer can original patterns based on knowledge of process rules, process parameters, desirable layout features, or other such engineering input.

At process block 1620, a number of sub-patterns are identified in the layout design. For example, a portion of an integrated circuit layout can be analyzed using a layout verification tool in order to determine locations of sub-patterns identified at process block 1610 within the integrated circuit layout. For example, the sub-patterns in the pattern library can be transformed into a format that allows for DRC rules to be used to identify the sub-patterns. In some examples, an intermediate GDSII or OASIS file can be generated that has markers indicating the x-y location of the identified sub-pattern, along with and identifier of the sub-pattern itself (e.g., a numerical identifier of the sub-pattern in the pattern library).

At process block 1630, signatures are generated based on the identified sub-patterns that were identified in the layout design at process block 1620. For example, combinations of sub-patterns immediately or in close proximity to other sub-patterns can be compared to sub-patterns previously identified in a reference library. For example, if a reference pattern includes sub-patterns numbers 1, 2, 3, 4, 5, 6, 7, 8, 9, a similar arrangement of those sub-patterns in the layout design can be used as the signature. Information in the reference pattern can include adjacency of different identified sub-patterns.

At process block 1640, one or more reference patterns are created based on the signatures generated at process block 1630. For example, one of the sub-patterns may be identified as an anchor sub-pattern for the pattern, and the arrangement of other sub-patterns in proximity to that anchor sub-pattern is used to generate a reference pattern. The reference pattern can also include the arrangement of the sub-patterns, as well as a bounding box for the source layout pattern. Thus, when comparing sub-patterns generated for a particular layout design of interest, the sub-patterns in the particular layout can be compared to sub-patterns for the reference pattern generated in this process block.

At process block 1650, similar patterns are searched for and a layout design based on the signatures generated at process block 1630, and the patterns identified at process block 1640. For example, a number of sub-patterns can be identified in the layout design. The pattern of the sub-patterns are then compared to reference patterns in the pattern library. In some examples, only exact matches (e.g., a match for all nine sub-patterns) are considered a match to the reference pattern, while in other examples, partial matches can be included as well. For example, if there is an exact match for an anchor sub-pattern (e.g., the center sub-pattern and a nine sub-pattern analysis), and five other sub-patterns match, but not all nine sub-patterns, this can be considered a partial match. In some examples, partial matching is based on tolerance values or other parameters provided by the user. For example, a match can be determined based on the percentage of area of layers in the sub-patterns between the prospective layout match and the sub-pattern in the pattern library. In other examples, the perimeter of layers, the number of vertices, or other techniques can be used to determine how closely sub-patterns match the reference pattern. For example, an XOR operation can be performed on the sub-pattern of interest and the reference library sub-pattern and the area difference calculated to derive the amount of matching for that particular sub-pattern.

In some examples, a large number of similar patterns will be determined. These results can be sorted based on the degree with which the patterns match. For example, exact matches can be sorted first, followed by very close matches, and then by less close matches. In some examples, a fixed number of the top matches are selected for further analysis, for example the top 10, top 100, top 1000, or other number of matches.

At process block 1660, results of the pattern search performed at process block 1650 can be presented for further analysis. For example, a layout display tool can display an XOR between the prospective pattern in the analyzed layout and the pattern in the reference library. In some examples, the analyzed layout can be automatically corrected to change the layout based on finding these patterns. In some examples, a metric or a statistical map of the analyzed layout can be generated for further analysis. In some examples, the analyzed layout is adjusted or modified based on the results of the pattern search, and this modified layout is used to manufacture a photo lithographic mask or reticle, which in turn is used to manufacture an integrated circuit.

Example Electronic Design Automation Environment

Various examples of the disclosed subject matter are related to electronic design automation. In particular, various examples cam be used to improve the operation of electronic design automation software tools that identify, verify, and/or modify design data for manufacturing a microdevice, such as a microcircuit. As used herein, the terms "design" and "design data" are intended to encompass data describing an entire microdevice, such as an integrated circuit device or micro-electromechanical system (MEMS) device. This term also is intended to encompass a smaller set of data describing one or more components of an entire microdevice, however, such as a layer of an integrated circuit device, or even a portion of a layer of an integrated circuit device. Still further, the terms "design" and "design data" also are intended to encompass data describing more than one microdevice, such as data to be used to create a mask or reticle for simultaneously forming multiple microdevices on a single wafer. It should be noted that, unless otherwise specified, the term "design" as used herein is intended to encompass any type of design, including both a physical layout design and a logical design.

Designing and fabricating microcircuit devices involve many steps during a "design flow" process. These steps are highly dependent on the type of microcircuit, its complexity, the design team, and the fabricator or foundry that will manufacture the microcircuit from the design. Several steps are common to most design flows, however. First, a design specification is modeled logically, typically in a hardware design language (HDL). Once a logical design has been created, various logical analysis processes are performed on the design to verify its correctness. More particularly, software and hardware "tools" verify that the logical design will provide the desired functionality at various stages of the design flow by running software simulators and/or hardware emulators, and errors are corrected. For example, a designer may employ one or more functional logic verification processes to verify that, given a specified input, the devices in a logical design will perform in the desired manner and provide the appropriate output.

In addition to verifying that the devices in a logic design will provide the desired functionality, some designers may employ a design logic verification process to verify that the logical design meets specified design requirements. For example, a designer may create rules such as, e.g., every transistor gate in the design must have an electrical path to ground that passes through no more than three other devices, or every transistor that connects to a specified power supply also must be connected to a corresponding ground node, and not to any other ground node. A design logic verification process then will determine if a logical design complies with specified rules, and identify occurrences where it does not.

After the logical design is deemed satisfactory, it is converted into physical design data by synthesis software. This physical design data or "layout" design data may represent, for example, the geometric elements that will be written onto a mask used to fabricate the desired microcircuit device in a photolithographic process at a foundry. For conventional mask or reticle writing tools, the geometric elements typically will be polygons of various shapes. Thus, the layout design data usually includes polygon data describing the features of polygons in the design. It is very important that the physical design information accurately embody the design specification and logical design for proper operation of the device. Accordingly, after it has been created during a synthesis process, the physical design data is compared with the original logical design schematic in a process sometimes referred to as a "layout-versus-schematic" (LVS) process.

Once the correctness of the logical design has been verified, and geometric data corresponding to the logical design has been created in a layout design, the geometric data then can be analyzed. For example, because the physical design data is employed to create masks used at a foundry, the data must conform to the foundry's requirements. Each foundry specifies its own physical design parameters for compliance with their processes, equipment, and techniques. Accordingly, the design flow may include a process to confirm that the design data complies with the specified parameters. During this process, the physical layout of the circuit design is compared with design rules in a process commonly referred to as a "design rule check" (DRC) process. In addition to rules specified by the foundry, the design rule check process may also check the physical layout of the circuit design against other design rules, such as those obtained from test chips, general knowledge in the industry, previous manufacturing experience, or other sources of design rules.

With modern electronic design automation design flows, a designer may additionally employ one or more "design-for-manufacture" (DFM) software tools. As previously noted, design rule check processes attempt to identify, for examples, layout features representing structures that will almost certainly be improperly formed during a manufacturing process. "Design-For-Manufacture" tools, however, provide processes that attempt to identify elements in a design representing structures with a significant likelihood of being improperly formed during the manufacturing process. A "design-for-manufacture" process may additionally determine what impact the improper formation of the identified elements will have on the yield of devices manufactured from the circuit design, and/or modifications that will reduce the likelihood that the identified elements will be improperly formed during the manufacturing process. For example, a "design-for-manufacture" (DFM) software tool may identify wires that are connected by only a single via, determine the yield impact for manufacturing a circuit from the design based upon the probability that each individual single via will be improperly formed during the manufacturing process, and then identify areas where redundant vias can be formed to supplement the single vias.

It should be noted that, in addition to "design-for-manufacture," various alternate terms are used in the electronic design automation industry. Accordingly, as used herein, the term "design-for-manufacture" or "design-for-manufacturing" is intended to encompass any electronic design automation process that identifies elements in a design representing structures that may be improperly formed during the manufacturing process. Thus, "design-for-manufacture" (DFM) software tools will include, for example, "lithographic friendly design" (LFD) tools that assist designers to make trade-off decisions on how to create a circuit design that is more robust and less sensitive to lithographic process windows. They will also include "design-for-yield" (DFY) electronic design automation tools, "yield assistance" electronic design automation tools, and "chip cleaning" and "design cleaning" electronic design automation tools.

After a designer has used one or more geometry analysis processes to verify that the physical layout of the circuit design is satisfactory, the designer may then perform one or more simulation processes to simulate the operation of a manufacturing process, in order to determine how the design will actually be realized by that particular manufacturing process. A simulation analysis process may additionally modify the design to address any problems identified by the simulation. For example, some design flows may employ one or more processes to simulate the image formed by the physical layout of the circuit design during a photolithographic process, and then modify the layout design to improve the resolution of the image that it will produce during a photolithography process.

These resolution enhancement techniques (RET) may include, for example, modifying the physical layout using optical proximity correction (OPC) or by the addition of sub-resolution assist features (SRAF). Other simulation analysis processes may include, for example, phase shift mask (PSM) simulation analysis processes, etch simulation analysis processes and planarization simulation analysis processes. Etch simulation analysis processes simulate the removal of materials during a chemical etching process, while planarization simulation processes simulate the polishing of the circuit's surface during a chemical-mechanical etching process. These simulation analysis processes may identify, for example, regions where an etch or polishing process will not leave a sufficiently planar surface. These simulation analysis processes may then modify the physical layout design to, e.g., include more geometric elements in those regions to increase their density.

Once a physical layout design has been finalized, the geometric elements in the design are formatted for use by a mask or reticle writing tool. Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool. Accordingly, the larger geometric elements in a physical layout design data will typically be "fractured" into the smaller, more basic polygons that can be written by the mask or reticle writing tool.

It should be appreciated that various design flows may repeat one or more processes in any desired order. Thus, with some design flows, geometric analysis processes can be interleaved with simulation analysis processes and/or logical analysis processes. For example, once the physical layout of the circuit design has been modified using resolution enhancement techniques, then a design rule check process or design-for-manufacturing process may be performed on the modified layout, Further, these processes may be alternately repeated until a desired degree of resolution for the design is obtained. Similarly, a design rule check process and/or a design-for-manufacturing process may be employed after an optical proximity correction process, a phase shift mask simulation analysis process, an etch simulation analysis process or a planarization simulation analysis process.

Example Software Tools for Simulation, Verification or Modification of a Circuit Layout To facilitate an understanding of various embodiments of the disclosed technology, one such software tool for automatic design automation, directed to the analysis and modification of a design for an integrated circuit, will now be generally described. As previously noted, the terms "design" and "design data" are used herein to encompass data describing an entire microdevice, such as an integrated circuit device or micro-electromechanical system (MEMS) device. These terms also are intended, however, to encompass a smaller set of data describing one or more components of an entire microdevice, such as a layer of an integrated circuit device, or even a portion of a layer of an integrated circuit device. Still further, the terms "design" and "design data" also are intended to encompass data describing more than one microdevice, such as data to be used to create a mask or reticle for simultaneously forming multiple microdevices on a single wafer. As also previously noted, unless otherwise specified, the term "design" as used herein is intended to encompass any type of design, including both physical layout designs and logical designs.

Figure 17:
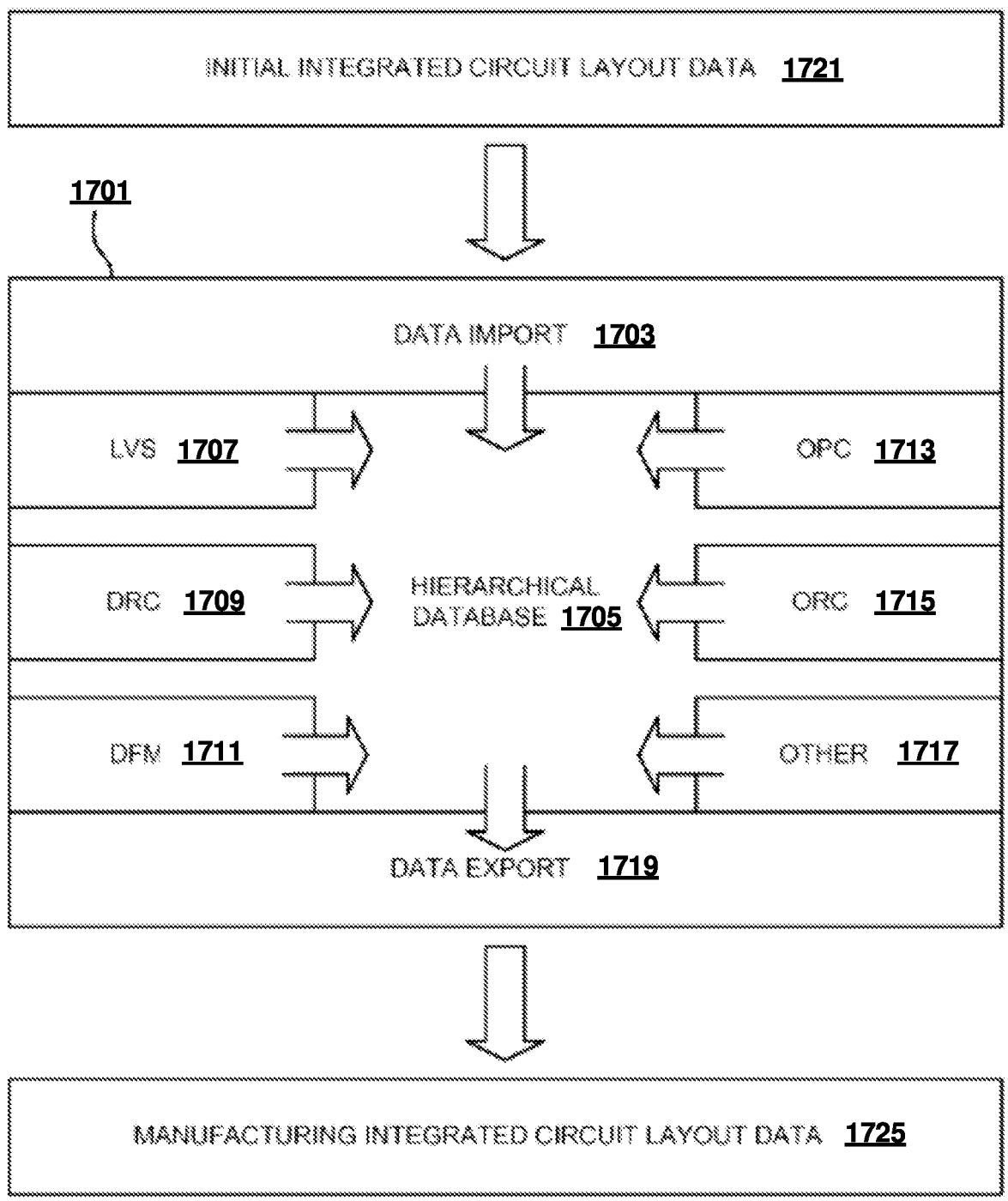
FIG. 17 illustrates an example Electronic Design Automation environment in which certain examples of the disclosed technology can be implemented.

As seen in the diagram 1700 of FIG. 17, an analysis tool 1701, which may be implemented by a variety of different software applications, includes a data import module 1703 and a hierarchical database 1705. The analysis tool 1701 also includes a layout-versus-schematic (LVS) verification module 1707, a design rule check (DRC) module 1709, a design-for-manufacturing (DFM) module 1711, an optical proximity correction (OPC) module 1713, and an optical proximity rule check (ORC) module 1715. The analysis tool 1701 may further include other modules 1717 for performing additional functions as desired, such as a phase shift mask (PSM) module (not shown), an etch simulation analysis module (not shown) and/or a planarization simulation analysis module (not shown). The tool 1701 also has a data export module 1719. One example of such an analysis tool is the Calibre family of software applications available from Mentor Graphics Corporation of Wilsonville, Oreg.

Initially, the tool 1701 receives data 1721 describing a physical layout design for an integrated circuit. The layout design data 1721 may be in any desired format, such as, for example, the Graphic Data System II (GDSII) data format or the Open Artwork System Interchange Standard (OASIS) data format proposed by Semiconductor Equipment and Materials International (SEMI). Other formats for the data 1721 may include an open source format named Open Access, Milkyway by Synopsys, Inc., and EDDM by Mentor Graphics, Inc. The layout data 1721 includes geometric elements for manufacturing one or more portions of an integrated circuit device. For example, the initial integrated circuit layout data 1721 may include a first set of polygons for creating a photolithographic mask that in turn will be used to form an isolation region of a transistor, a second set of polygons for creating a photolithographic mask that in turn will be used to form a contact electrode for the transistor, and a third set of polygons for creating a photolithographic mask that in turn will be used to form an interconnection line to the contact electrode. The initial integrated circuit layout data 1721 may be converted by the data import module 1703 into a format that can be more efficiently processed by the remaining components of the tool 1701.

Once the data import module 1703 has converted the original integrated circuit layout data 1721 to the appropriate format, the layout data 1721 is stored in the hierarchical database 1705 for use by the various operations executed by the modules 1705-1617. Next, the layout-versus-schematic module 1707 checks the layout design data 1721 in a layout-versus-schematic process, to verify that it matches the original design specifications for the desired integrated circuit. If discrepancies between the layout design data 1721 and the logical design for the integrated circuit are identified, then the layout design data 1721 may be revised to address one or more of these discrepancies. Thus, the layout-versus-schematic process performed by the layout-versus-schematic module 1707 may lead to a new version of the layout design data with revisions. According to various implementations of the tool 1701, the layout data 1721 may be manually revised by a user, automatically revised by the layout-versus-schematic module 1707, or some combination thereof.

Next, the design rule check module 1709 confirms that the verified layout data 1721 complies with defined geometric design rules. If portions of the layout data 1721 do not adhere to or otherwise violate the design rules, then the layout data 1721 may be modified to ensure that one or more of these portions complies with the design rules. The design rule check process performed by the design rule check module 1709 thus also may lead to a new version of the layout design data with various revisions. Again, with various implementations of the tool 1701, the layout data 1721 may be manually modified by a user, automatically modified by the design rule check module 1709, or some combination thereof.

The modified layout data 1725 is then processed by the design for manufacturing module 1711. As previously noted, a "design-for-manufacture" processes attempts to identify elements in a design representing structures with a significant likelihood of being improperly formed during the manufacturing process. A "design-for-manufacture" process may additionally determine what impact the improper formation of the identified structures will have on the yield of devices manufactured from the circuit design, and/or modifications that will reduce the likelihood that the identified structures may be improperly formed during the manufacturing process. For example, a "design-for-manufacture" (DFM) software tool may identify wires that are connected by single vias, determine the yield impact based upon the probability that each individual single via will be improperly formed during the manufacturing process, and then identify areas where redundant visa can be formed to supplement the single vias.

The processed layout data 1721 is then passed to the optical proximity correction module 1713, which corrects the layout data 1721 for manufacturing distortions that would otherwise occur during the lithographic patterning. For example, the optical proximity correction module 1713 may correct for image distortions, optical proximity effects, photoresist kinetic effects, and etch loading distortions. The layout data 1721 modified by the optical proximity correction module 1713 then is provided to the optical process rule check module 1715.

The optical process rule check module 1715 (more commonly called the optical rules check module or ORC module) ensures that the changes made by the optical proximity correction module 1713 are actually manufacturable, a "downstream-looking" step for layout verification. This compliments the "upstream-looking" step of the LVS performed by the LVS module 1707 and the self-consistency check of the DRC process performed by the DRC module 1709, adding symmetry to the verification step. Thus, each of the processes performed by the design for manufacturing process 1711, the optical proximity correction module 1713, and the optical process rule check module 1715 may lead to a new version of the layout design data with various revisions.

As previously noted, other modules 1717 may be employed to perform alternate or additional manipulations of the layout data 1721, as desired. For example, some implementations of the tool 1701 may employ, for example, a phase shift mask module. As previously discussed, with a phase-shift mask (PSM) analysis (another approach to resolution enhancement technology (RET)), the geometric elements in a layout design are modified so that the pattern they create on the reticle will introduce contrast-enhancing interference fringes in the image. The tool 1701 also may alternately or additionally employ, for example, an etch simulation analysis processes or a planarization simulation analysis processes. The process or processes performed by each of these additional modules 1717 may also lead to the creation of a new version of the layout data 1725 that includes revisions.

After all of the desired operations have been performed on the initial layout data 1721, the data export module 1719 converts the processed layout data 1721 into manufacturing integrated circuit layout data 1725 that can be used to form one or more masks or reticules to manufacture the integrated circuit (that is, the data export module 1719 converts the processed layout data 1725 into a format that can be used in a photolithographic manufacturing process). Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool. In an Accordingly, the data export module 1719 may "fracture" larger geometric elements in the layout design, or geometric elements that are not right triangles, rectangles or trapezoids (which typically are a majority of the geometric elements in a layout design) into the smaller, more basic polygons that can be written by the mask or reticle writing tool. Of course, the data export module 1719 may alternately or additionally convert the processed layout data 1721 into any desired type of data, such as data for use in a synthesis process (e.g., for creating an entry for a circuit library), data for use in a place-and-route process, data for use in calculating parasitic effects, etc. Further, the tool 1701 may store one or more versions of the layout 1725 containing different modifications, so that a designer can undo undesirable modifications. For example, the hierarchical database 1705 may store alternate versions of the layout data 1725 created during any step of the process flow between the modules 1707-1617.

Example Computing Environment

Figure 18:
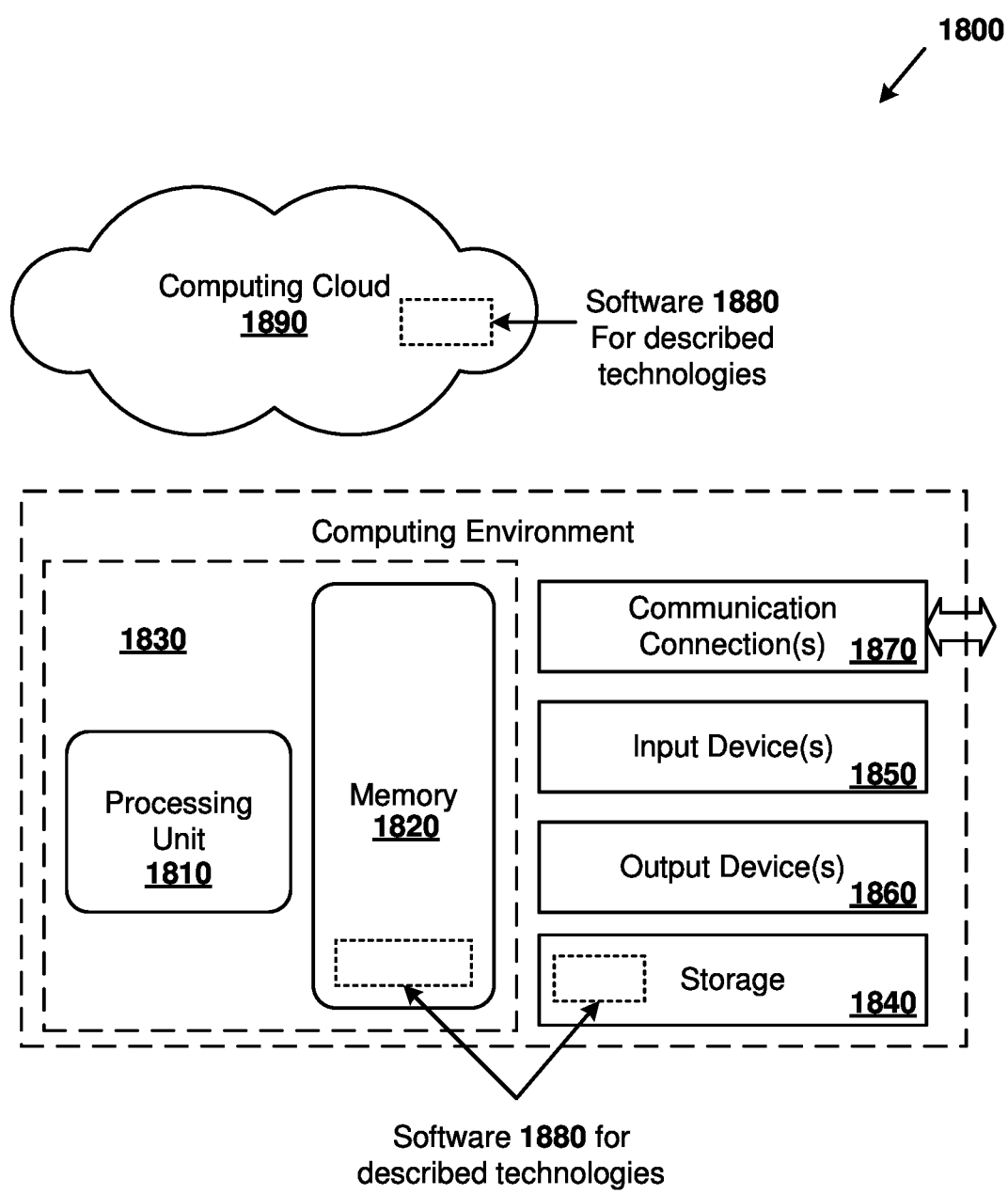
FIG. 18 illustrates an example of a suitable computing environment in which certain examples of the disclosed technology can be implemented.

FIG. 18 illustrates a generalized example of a suitable computing environment 1800 in which described embodiments, techniques, and technologies, including pattern matching, puzzle matching, and/or pattern classification, can be implemented. For example, the computing environment 1800 can implement any of the analysis operations, as described herein.

The computing environment 1800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 18, the computing environment 1800 includes at least one central processing unit 1810 and memory 1820. In FIG. 18, this most basic configuration 1830 is included within a dashed line. The central processing unit 1810 executes computer-executable instructions and may be a real or a virtual processor. In a multi-processing system, multiple processing units execute computer-executable instructions to increase processing power and as such, multiple processors can be running simultaneously. The memory 1820 may be volatile memory (e.g., registers, cache, RAM), non-volatile memory (e.g., ROM, EEPROM, flash memory, etc.), or some combination of the two. The memory 1820 stores software 1880, images, and video that can, for example, implement the technologies described herein. A computing environment may have additional features. For example, the computing environment 1800 includes storage 1840, one or more input devices 1850, one or more output devices 1860, and one or more communication connections 1870. An interconnection mechanism (not shown) such as a bus, a controller, or a network, interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other medium which can be used to store information and that can be accessed within the computing environment 1800. The storage 1840 stores instructions for the software 1880, which can be used to implement technologies described herein.

The input device(s) 1850 may be a touch input device, such as a keyboard, keypad, mouse, touch screen display, pen, or trackball, a voice input device, a scanning device, or another device, that provides input to the computing environment 1800. For audio, the input device(s) 1850 may be a sound card or similar device that accepts audio input in analog or digital form, or a CD-ROM reader that provides audio samples to the computing environment 1800. The output device(s) 1860 may be a display, printer, speaker, CD-writer, or another device that provides output from the computing environment 1800.

The communication connection(s) 1870 enable communication over a communication medium (e.g., a connecting network) to another computing entity. The communication medium conveys information such as computer-executable instructions, compressed graphics information, video, or other data in a modulated data signal. The communication connection(s) 1870 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed computer-executable instructions. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1890. For example, layout design operations can be performed in the computing environment 1800 while analysis operations can be performed on servers located in the computing cloud 1890. In some examples, the servers in the computing cloud 1890 are located in a different country or jurisdiction than the computing environment.

Computer-readable media are any available media that can be accessed within a computing environment 1800. By way of example, and not limitation, with the computing environment 1800, computer-readable media include memory 1820 and/or storage 1840. As should be readily understood, the term computer-readable storage media includes the media for data storage such as memory 1820 and storage 1840, and not transmission media such as modulated data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims and their equivalents.

What is claimed is:

1. A computing device, comprising:
a processor;
memory coupled to the processor, the memory storing computer-readable instructions that when executed by the processor, cause the processor to perform operations, the operations comprising:
decomposing a first layout of interest associated with an integrated circuit into a plurality of groups of layout patterns;
associating each of the groups of layout patterns with a canonically unique identifier so as to define a plurality of canonically unique identifiers;
storing the plurality of canonically unique identifiers in a pattern database so as to generate the pattern database;
decomposing a second layout of interest into layout sub-patterns;
identifying that at least one of the layout sub-patterns is associated with at least one of the plurality of groups of layout patterns;
identifying the canonically unique identifier for each of the identified layout sub-patterns associated with at least one of the plurality of groups of layout patterns;
using the canonically unique identifier for a respective identified layout sub-pattern, identifying a pattern defined by two or more of the layout sub-patterns associated with at least one of the plurality of groups of layout patterns, thereby performing puzzle matching;
determining a tolerance level defined by each of the identified layout sub-patterns; and
making a comparison of the respective tolerance levels to a predetermined tolerance, the predetermined tolerance indicative of whether the pattern matches a target layout.

2. The computing device as recited in claim 1, wherein identifying the pattern further comprises searching the pattern database for layout sub-patterns nearby or adjacent to the canonically unique identifier of the respective identified layout sub-pattern.

3. The computing device as recited in claim 1, the operations further comprising:
generating at least one signature based on the layout sub-patterns associated with at least one of the plurality of groups of layout patterns.

4. The computing device as recited in claim 3, wherein making the comparison further comprising:
comparing at least one or more of the following: an area, a perimeter, a layer designation, a number of vertices, or an output of a Boolean operation for an identified sub-pattern and a reference sub-pattern of the target layout.

5. A method performed by a computer, the method comprising:
decomposing a first layout of interest associated with an integrated circuit into a plurality of groups of layout patterns;
associating each of the groups of layout patterns with a canonically unique identifier so as to define a plurality of canonically unique identifiers;
storing the plurality of canonically unique identifiers in a pattern database so as to generate the pattern database;
decomposing a second layout of interest into layout sub-patterns;
identifying that at least one of the layout sub-patterns is associated with at least one of the plurality of groups of layout patterns;
identifying the canonically unique identifier for each of the layout sub-patterns associated with at least one of the plurality of groups of layout patterns;
using the canonically unique identifier for a respective identified layout sub-pattern, identifying a pattern defined by two or more of the layout sub-patterns associated with at least one of the plurality of groups of layout patterns, thereby performing puzzle matching;
determining a tolerance level defined by each of the identified layout sub-patterns; and
making a comparison of the respective tolerance levels to a predetermined tolerance, the predetermined tolerance indicative of whether the pattern matches a target layout.

6. The method as recited in claim 5, wherein identifying the pattern further comprises searching the pattern database for layout sub-patterns nearby or adjacent to the canonically unique identifier of the respective identified layout sub-pattern.

7. The method as recited in claim 5, the method further comprising:
generating at least one signature based on the layout sub-patterns associated with at least one of the plurality of groups of layout patterns.

8. The method as recited in claim 7, wherein making the comparison further comprising:
comparing at least one or more of the following: an area, a perimeter, a layer designation, a number of vertices, or an output of a Boolean operation for an identified sub-pattern and a reference sub-pattern of the target layout.

* * * * *